(12) United States Patent
Mathur

(10) Patent No.: US 12,451,170 B2
(45) Date of Patent: Oct. 21, 2025

(54) DUAL REFERENCE ZQ CALIBRATION CIRCUITS AND METHODS

(71) Applicant: Sandisk Technologies, Inc., Milpitas, CA (US)

(72) Inventor: Shiv Harit Mathur, Bangalore (IN)

(73) Assignee: Sandisk Technologies, Inc., Milpitas, CA (US)

(*) Notice: Subject to any disclaimer, the term of this patent is extended or adjusted under 35 U.S.C. 154(b) by 165 days.

(21) Appl. No.: 18/355,366

(22) Filed: Jul. 19, 2023

(65) Prior Publication Data

US 2024/0379138 A1 Nov. 14, 2024

Related U.S. Application Data

(60) Provisional application No. 63/500,698, filed on May 8, 2023.

(51) Int. Cl.
*G11C 7/00* (2006.01)
*G11C 7/10* (2006.01)
*G11C 16/04* (2006.01)

(52) U.S. Cl.
CPC ........ *G11C 7/1048* (2013.01); *G11C 16/0483* (2013.01); *G11C 2207/2254* (2013.01)

(58) Field of Classification Search
CPC .. H03K 19/003; H03K 17/16; H03K 19/0175; H03K 19/00; H03K 17/693; H03K 17/60; H03K 17/687; H03K 19/0185; H03K 3/00; H03K 3/353; G11C 7/10; G11C 5/14; G11C 7/00; G11C 7/22; G11C 11/00; G11C 11/16; G11C 11/406; G11C 11/4076; G11C 16/04; G11C 29/02; G11C 29/38; G11C 29/50; G11C 5/00; G11C 7/04

See application file for complete search history.

(56) References Cited

U.S. PATENT DOCUMENTS 10,224,928 B1 * 3/2019 Mathur ............ G11C 11/40615

* cited by examiner

*Primary Examiner* — Thong Q Le
(74) *Attorney, Agent, or Firm* — PEARL COHEN ZEDEK LATZER BARATZ LLP

(57) ABSTRACT

An apparatus is provided that includes a first pull-up driver circuit coupled to a first calibration node, an internal resistor circuit and first input/output pad on an integrated circuit die, a second pull-up driver circuit coupled to a second calibration node and second input/output pad on the integrated circuit die, a third pull-up driver circuit coupled to a third calibration node, a comparator including a first input terminal selectively coupled to the first calibration node, the second calibration node and the third calibration node, and a second input terminal coupled to a reference voltage, and circuitry configured to trim the reference voltage to compensate for a comparator offset, and trim an impedance of the internal resistor circuit by comparing a voltage on the first calibration node and the trimmed reference voltage. The trimmed impedance of the internal resistor circuit substantially equals a desired impedance of the third pull-up driver circuit.

19 Claims, 14 Drawing Sheets

DUAL REFERENCE ZQ CALIBRATION CIRCUITS AND METHODS

CLAIM OF PRIORITY

The present application claims priority from U.S. Provisional Patent Application No. 63/500,698, entitled "DUAL REFERENCE ZQ CALIBRATION CIRCUITS AND METHODS," filed May 8, 2023, which is incorporated by reference herein in its entirety.

BACKGROUND

The present technology relates to semiconductor integrated circuit devices.

Most semiconductor integrated circuit devices include an input circuit configured to receive signals from the outside world via input pads (or pins) and an output circuit configured to provide internal signals to the outside via world output pads (or pins). Some input circuits may have a termination resistor for impedance matching of the external transmission line. The output circuit also can have an output driver that has an impedance that ideally matches an impedance of the external transmission line. The impedance of both the termination resistor and the output driver can change due to various circumstances such as variation of a power supply voltage, operating temperature, etc. Thus, an impedance mismatch can arise.

An impedance mismatch may cause signal reflection, which may compromise signal integrity. As the operating speed of semiconductor integrated circuit devices has increased, the peak-to-peak voltage of signals communicated between semiconductor devices has been reduced to decrease supply current and to minimize signal transmission delay time. However, such communicated signals are more susceptible to external noise, and signal reflection due to impedance mismatch at an interface terminal becomes more problematic. In particular, an impedance mismatch may impair high-speed data transmission and distort output data.

To alleviate impedance mismatch, output drivers and/or termination resistors of a semiconductor integrated circuit device periodically may be calibrated. One calibration technique is referred to as ZQ calibration. Conventionally, ZQ calibration uses a precision calibration resistor that is located off chip, and is often referred to an "external" calibration resistor. The semiconductor integrated circuit device may have a reference impedance circuit which is calibrated with respect to the external calibration resistor. ZQ calibration adjusts the impedance of the reference impedance circuit until it is calibrated to the external calibration resistor. This results in an impedance code that can be used to adjust the impedance of the device's output drivers or on-die termination circuitry.

DETAILED DESCRIPTION

Technology is described for an on-die dual reference ZQ calibration system that may be used with an external resistor or an internal resistor circuit to perform ZQ calibration. In an embodiment, the internal resistor circuit has a impedance substantially similar to an impedance of the external resistor. Without wanting to be bound by any particular theory, it is believed that this enables the ZQ calibration system to be implemented in a smaller area and consume less power than previously known ZQ calibration system.

In an embodiment, the internal resistor circuit includes a coarse trim circuit and a fine trim circuit for trimming the impedance of the internal resistor circuit. Without wanting to be bound by any particular theory, it is believed that the coarse and fine trim circuits may be used to tighten a tolerance of the impedance of the internal resistor circuit.

In an embodiment, the internal resistor circuit includes a temperature trim circuit for trimming the impedance of the internal resistor circuit based on a temperature of the integrated circuit die. Without wanting to be bound by any particular theory, it is believed that the temperature trim circuit may be used to further tighten a tolerance of the impedance of the internal resistor circuit.

In an embodiment, the ZQ calibration system includes a comparator and an offset correction circuit for trimming a reference voltage to correct for an offset of the comparator. Without wanting to be bound by any particular theory, it is believed that the offset correction circuit may be used to reduce ZQ calibration errors.

Figure 1:
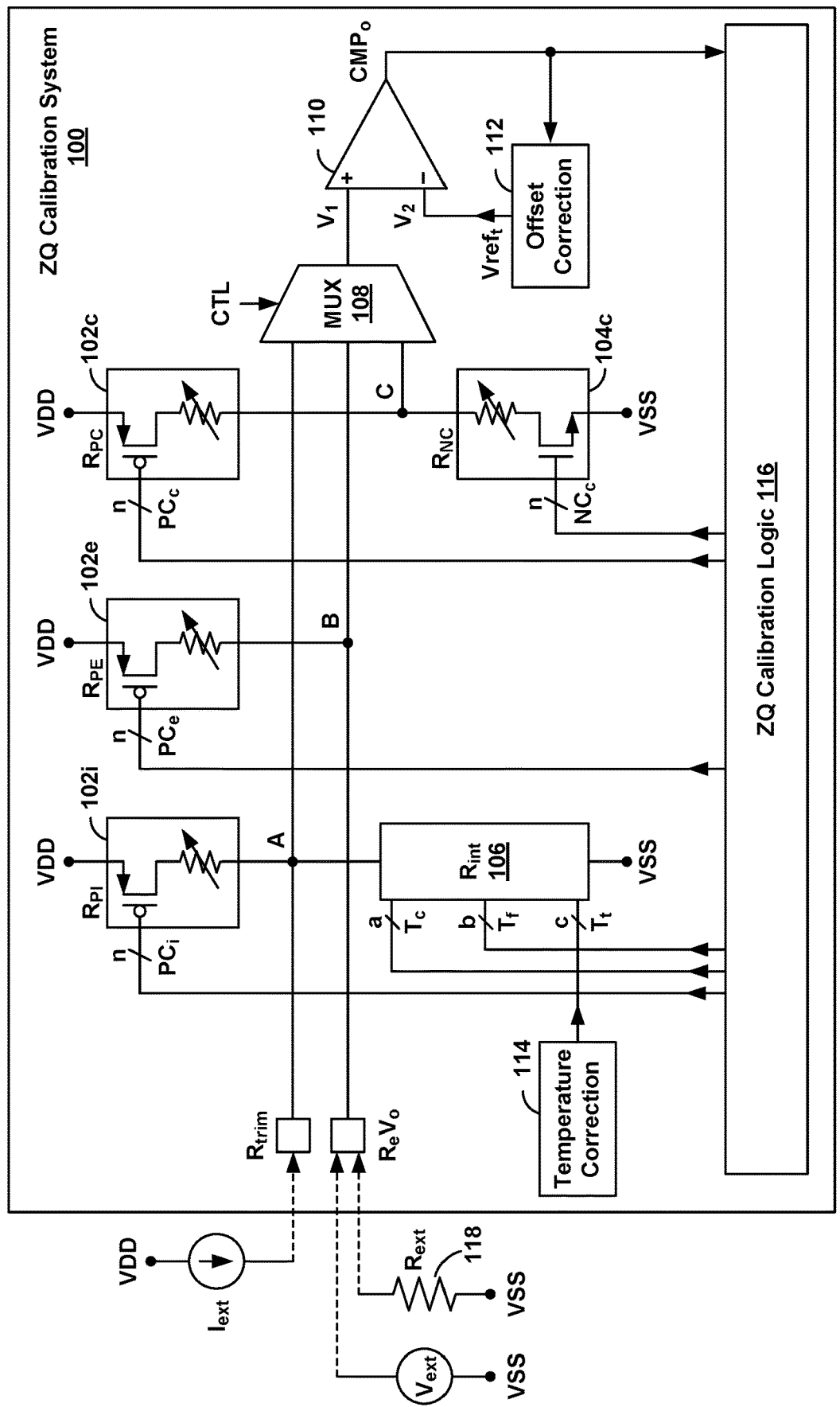
FIG. 1 is a diagram of an embodiment of a dual reference ZQ calibration system.

FIG. 1 is a diagram of an embodiment of a dual reference ZQ calibration system 100. Dual reference ZQ calibration system 100 includes a first pull-up driver circuit 102i, a second pull-up driver circuit 102e, a third pull-up driver circuit 102c, a first pull-down driver circuit 104c, an internal resistor circuit 106, a MUX 108, a comparator 110, an offset correction block 112, a temperature correction circuit 114, ZQ calibration logic 116, a first pad $R_{trim}$ and a second pad $R_eV_o$.

In an embodiment, the various components of dual reference ZQ calibration system 100 are fabricated on an integrated circuit wafer (e.g., a silicon wafer). In an embodiment, first pad $R_{trim}$ and a second pad $R_eV_o$ are input/out pads, such as solder bumps on an integrated circuit die. As described in more detail below, dual reference ZQ calibration system 100 may be used to perform ZQ calibration using either internal resistor circuit 106 or an external resistor 118 that has an impedance $R_{ext}$.

First pull-up driver circuit 102i has a first terminal coupled to a first power supply (e.g., VDD), a second terminal coupled to a first pull-up impedance code $PC_i$, and a third terminal coupled at a first calibration node A to first pad $R_{trim}$, a first input terminal of MUX 108 and a first terminal of internal resistor circuit 106. In an embodiment, first pull-up impedance code $PC_i$ is an n-bit code (e.g., n=6 or some other number). As described in more detail below, in an embodiment first pull-up driver circuit 102i includes a number of transistors and resistors, and has an impedance $R_{PI}$ that varies in response to a value of first pull-up impedance code $PC_i$. First pull-up driver circuit 102i is also referred to herein as a first variable impedance circuit.

Second pull-up driver circuit 102e has a first terminal coupled to first power supply VDD, a second terminal coupled to a second pull-up impedance code $PC_e$, and a third terminal coupled at a second calibration node B to second pad $R_eV_o$ and a second input terminal of MUX 108. In an embodiment, second pull-up impedance code $PC_e$ is an n-bit code (e.g., n=6 or some other number). As described in more detail below, in an embodiment second pull-up driver circuit 102e includes a number of transistors and resistors, and has an impedance $R_{PE}$ that varies in response to a value of second pull-up impedance code $PC_e$. Second pull-up driver circuit 102e is also referred to herein as a second variable impedance circuit.

Third pull-up driver circuit 102c has a first terminal coupled to first power supply VDD, a second terminal coupled to a third pull-up impedance code $PC_c$, and a third terminal coupled at a third calibration node C to a first terminal of first pull-down driver circuit 104c and a third input terminal of MUX 108. In an embodiment, third pull-up impedance code PCS is an n-bit code (e.g., n=6 or some other number). As described in more detail below, in an embodiment third pull-up driver circuit 102c includes a number of transistors and resistors, and has an impedance $R_{PC}$ that varies in response to a value of third pull-up impedance code $PC_e$. Third pull-up driver circuit 102c is also referred to herein as a third variable impedance circuit.

In an embodiment first pull-up driver circuit 102i, second pull-up driver circuit 102e, and third pull-up driver circuit 102c are substantially identical such that if third pull-up impedance code $PC_c$ is made equal to first pull-up impedance code $PC_i$, impedance $R_{PC}$ of third pull-up driver circuit 102c substantially equals impedance $R_{PI}$ of first pull-up driver circuit 102i. Likewise, if third pull-up impedance code $PC_c$ is made equal to second pull-up impedance code $PC_e$, impedance $R_{PC}$ of third pull-up driver circuit 102c substantially equals impedance $R_{PE}$ of second pull-up driver circuit 102e.

First pull-down driver circuit 104c has a second terminal coupled to a first pull-down impedance code $NC_c$, and a third terminal coupled to a second power supply VSS. In an embodiment, first pull-down impedance code $NC_c$ is an n-bit code (e.g., n=6 or some other number). As described in more detail below, in an embodiment first pull-down driver circuit 104c includes a number of transistors and resistors, and has an impedance $R_{NV}$ that varies in response to a value of first pull-down impedance code $NC_c$. First pull-down driver circuit 104c is also referred to herein as a fourth variable impedance circuit.

Internal resistor circuit 106 includes a second terminal coupled to a first impedance trim code $T_C$, a third input terminal coupled to a second impedance trim code $T_F$, a fourth input terminal coupled to a third impedance trim code $T_T$, and a fifth input terminal coupled to second power supply VSS. In an embodiment, first impedance trim code $T_C$ is an a-bit code (e.g., a=8 or some other number), second impedance trim code $T_F$ is a b-bit code (e.g., b=6 or some other number), and third impedance trim code $T_T$ is a c-bit code (e.g., c=5 or some other number).

As described in more detail below, in an embodiment internal resistor circuit 106 includes a number of transistors and resistors, and has an impedance $R_{int}$ that varies in response to values of first impedance trim code $T_C$, second impedance trim code $T_F$, and third impedance trim code $T_T$.

In an embodiment, internal resistor circuit 106 has an impedance $R_{int}$ that substantially equals as a desired impedance of third pull-up driver circuit 102c and a desired impedance of first pull-down driver circuit 104c. For example, if a desired impedance of third pull-up driver circuit 102c and a desired impedance of first pull-down driver circuit 104c is 200Ω, impedance $R_{int}$ has a nominal magnitude of 200Ω.

As described in more detail below, impedance $R_{int}$ of internal resistor circuit 106 substantially equals impedance $R_{ext}$ of external resistor 118.

MUX 108 has an output terminal coupled to a first input terminal $V_1$ (e.g., a non-inverting input) of comparator 110, which has a second input terminal $V_2$ (e.g., an inverting input) coupled to an output terminal of offset correction block 112. MUX 108 also has a control input terminal CTL that may be used to selectively couple one of first calibration node A, second calibration node B, and third calibration node C to first input terminal $V_1$ of comparator 110.

Comparator 110 provides at an output terminal an output signal $CMP_o$ that is proportional to a difference between a signal at first input terminal $V_1$ and a signal at second input terminal $V_2$, and which is coupled to an input terminal of offset correction block and an input terminal of ZQ calibration logic 116. ZQ calibration logic 116 may be implemented in a variety of ways, including but not limited to: a state machine, a processor, digital logic, or a combination of any of these elements. The processor may execute instructions that are stored on computer readable storage.

In an embodiment, the signal at second input terminal $V_2$ of comparator 110 is a reference voltage that has a desired magnitude $Vref_d$ equal to (VDD+VSS)/2 or (VDD+VSS)/3. For example, if second power supply VSS=0, the reference voltage has a desired magnitude $Vref_d$ equal to one half the magnitude of first power supply VDD. For simplicity, the remaining description will assume that second power supply VSS=0.

Comparator 110 ideally has zero offset voltage. In reality, however, comparator 110 will have a non-zero offset voltage. As described in more detail below, in an embodiment offset correction block 112 is configured to generate a trimmed reference voltage $Vref_t$ that is adapted to compensate for an offset of voltage of comparator 110. Offset correction block 112 provides trimmed reference voltage $Vref_t$ to second input terminal $V_2$ of comparator 110.

As described in more detail below, temperature correction circuit 114 is configured to generate third impedance trim code $T_t$ based on a die temperature to trim impedance $R_{int}$ of internal resistor circuit 106 to compensate for die temperature variations.

As described in more detail below, ZQ calibration logic 116 receives output signal $CMP_o$ from comparator 110 and is configured to generate first pull-up impedance code $PC_i$, second pull-up impedance code $PC_e$, third pull-up impedance code $PC_c$, and first pull-down impedance code $NC_c$ to control impedance $R_{PI}$ of first pull-up driver circuit 102i, impedance $R_{PE}$ of second pull-up driver circuit 102e, impedance $R_{PC}$ of third pull-up driver circuit 102c, and impedance $R_{NC}$ of first pull-down driver circuit 104c, respectively.

As also described in more detail below, ZQ calibration logic 116 receives output signal $CMP_o$ from comparator 110 and is configured to generate first impedance trim code $T_C$ and second impedance trim code $T_F$ to trim impedance $R_{int}$ of internal resistor circuit 106.

In an embodiment, an external current source $I_{ext}$ has a first terminal coupled to first power supply VDD and has a second terminal that may be selectively coupled to first pad $R_{trim}$ of dual reference ZQ calibration system 100. As described in more detail below, in an embodiment external current source $I_{ext}$ is selectively coupled to first pad $R_{trim}$ as part of a process to calibrate impedance $R_{int}$ of internal resistor circuit 106.

In an embodiment, an external voltage source $V_{ext}$ has a first terminal that may be selectively coupled to second pad $R_eV_o$ of dual reference ZQ calibration system 100 and has a second terminal coupled to second power supply VSS. As described in more detail below, in an embodiment external voltage source $V_{ext}$ is selectively coupled to second pad $R_eV_o$ as part of a process to calibrate trimmed reference voltage $Vref_t$.

In an embodiment, external resistor 118 has a first terminal that may be selectively coupled to second pad $R_eV_o$ of dual reference ZQ calibration system 100 and has a second terminal coupled to second power supply VSS. As described in more detail below, in an embodiment external resistor 118 is selectively coupled to second pad $R_eV_o$ as part of a process to calibrate impedance $R_{PE}$ of second pull-up driver circuit 102e, impedance $R_{PC}$ of third pull-up driver circuit 102c, and impedance $R_{NC}$ of first pull-down driver circuit 104c.

As described in more detail below, in an embodiment internal resistor circuit 106 may be used as part of a process to calibrate impedance $R_{PI}$ of first pull-up driver circuit 102i, impedance $R_{PC}$ of third pull-up driver circuit 102c, and impedance $R_{NC}$ of first pull-down driver circuit 104c.

Figure 2:
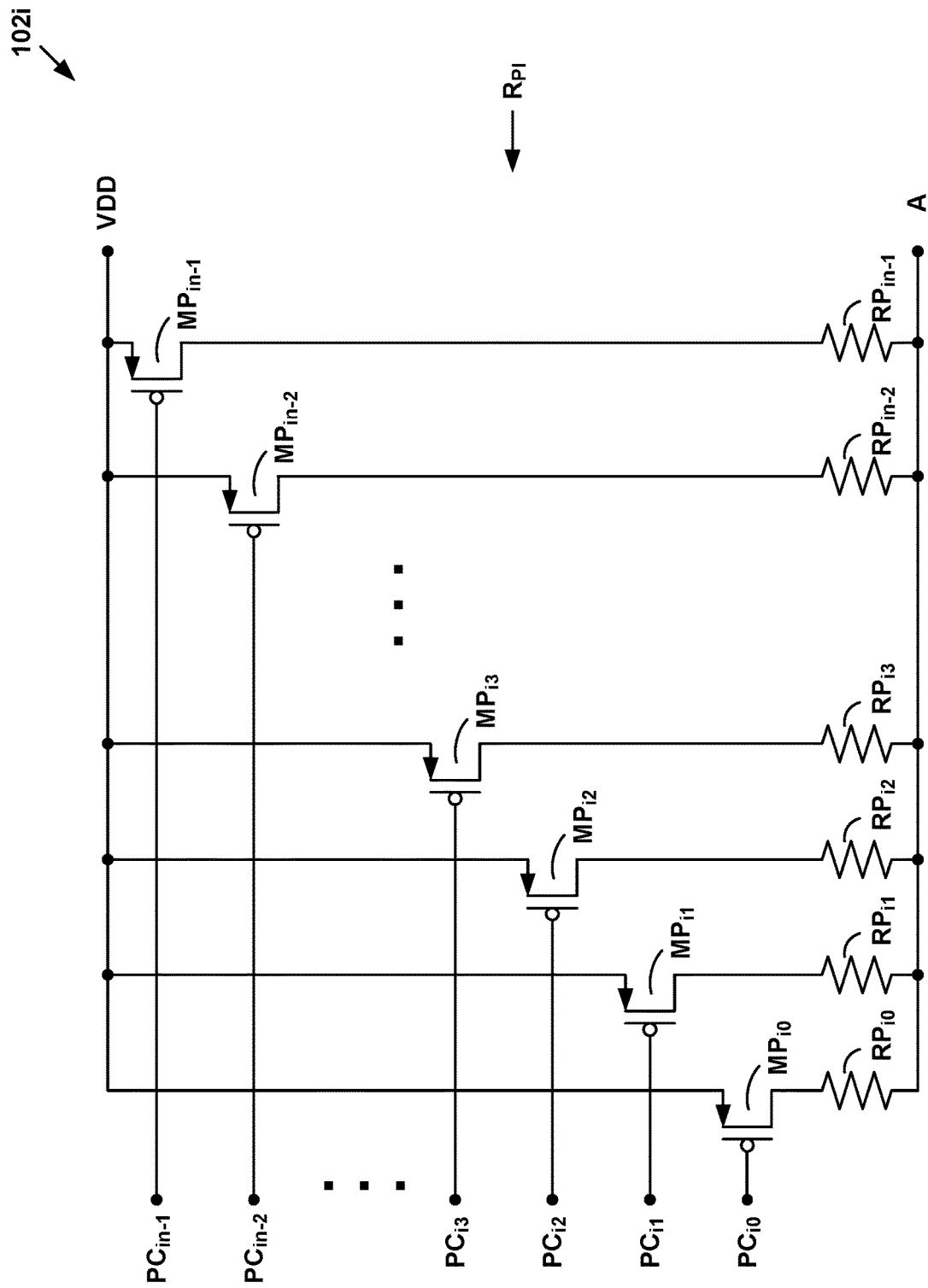
FIG. 2 is a diagram of an embodiment of a first pull-up driver circuit of FIG. 1.

FIG. 2 is a diagram of an embodiment of first pull-up driver circuit 102i of FIG. 1. In an embodiment, first pull-up driver circuit 102i is a replica of a pull-up driver circuit in an output buffer. Thus, first pull-up driver circuit 102i also may be referred to as a replica circuit. In an embodiment, first pull-up driver circuit 102i is a binary weighted replica pull-up driver circuit. In an embodiment, first pull-up driver circuit 102i is a replica of on-die termination.

First pull-up driver circuit 102i includes n transistors $MP_{i0}$, $MP_{i1}$, $MP_{i1}$, ..., $MP_{in-1}$, and n resistors $RP_{i0}$, $RP_{i1}$, $RP_{i2}$, ..., $RP_{in-1}$. In an embodiment, transistors $MP_{i0}$, $MP_{i1}$, $MP_{i2}$, ..., $MP_{in-1}$ are p-channel transistors. Each of transistors $MP_{i0}$, $MP_{i1}$, $MP_{i2}$, ..., $MP_{in-1}$ has a first terminal (e.g., a source terminal) coupled to first power supply VDD, a second terminal (e.g., a gate terminal) coupled to a corresponding bit of first pull-up impedance code $PC_i$ (e.g., $PC_{i0}$, $PC_{i1}$, $PC_{i2}$, ..., $PC_{in-1}$, respectively), and a third terminal (e.g., a drain terminal) coupled to a first terminal of a corresponding one of resistors $RP_{i0}$, $RP_{i1}$, $RP_{i2}$, ..., $RP_{in-1}$, respectively. Each of resistors $RP_{i0}$, $RP_{i1}$, $RP_{i2}$, ..., $RP_{in-1}$ has a second terminal coupled to first calibration node A of FIG. 1.

In an embodiment, resistors $RP_{i0}$, $RP_{i1}$, $RP_{i2}$, ..., $RP_{in-1}$ are binary weighted resistors. For example, $RP_{i0}=R_{PI}$, $RP_{i1}=2\times R_{PI}$, $RP_{i2}=4\times R_{PI}$, ..., $RP_{in-1}=2^{n-1}\times R_{PI}$. In an embodiment, transistors $MP_{i0}$, $MP_{i1}$, $MP_{i2}$, ..., $MP_{in-1}$ have a binary-weighted channel width-to-length ratio. For example, transistor $MP_{i0}$ has a channel width-to-length ratio (W/L), transistor $MP_{i1}$ has a channel width-to-length ratio (W/L)/2, transistor $MP_{i2}$ has a channel width-to-length ratio (W/L)/4, ..., transistor $MP_{in-1}$ has a channel width-to-length ratio $(W/L)/2^{n-1}$. Other configurations of resistors $RP_{i0}$, $RP_{i1}$, $RP_{i2}$, ..., $RP_{in-1}$ and transistors $MP_{i0}$, $MP_{i1}$, $MP_{i2}$, ..., $MP_{in-1}$ may be used.

In an embodiment, impedance $R_{PI}$ of first pull-up driver circuit 102i varies in response to a value of first pull-up impedance code $PC_i$. In the embodiment of FIG. 2, the value of first pull-up impedance code $PC_i$ is used to select which of transistors $MP_{i0}$, $MP_{i1}$, $MP_{i2}$, ..., $MP_{in-1}$ are turned ON or OFF to control impedance $R_{PI}$ of first pull-up driver circuit 102i.

Figure 3:
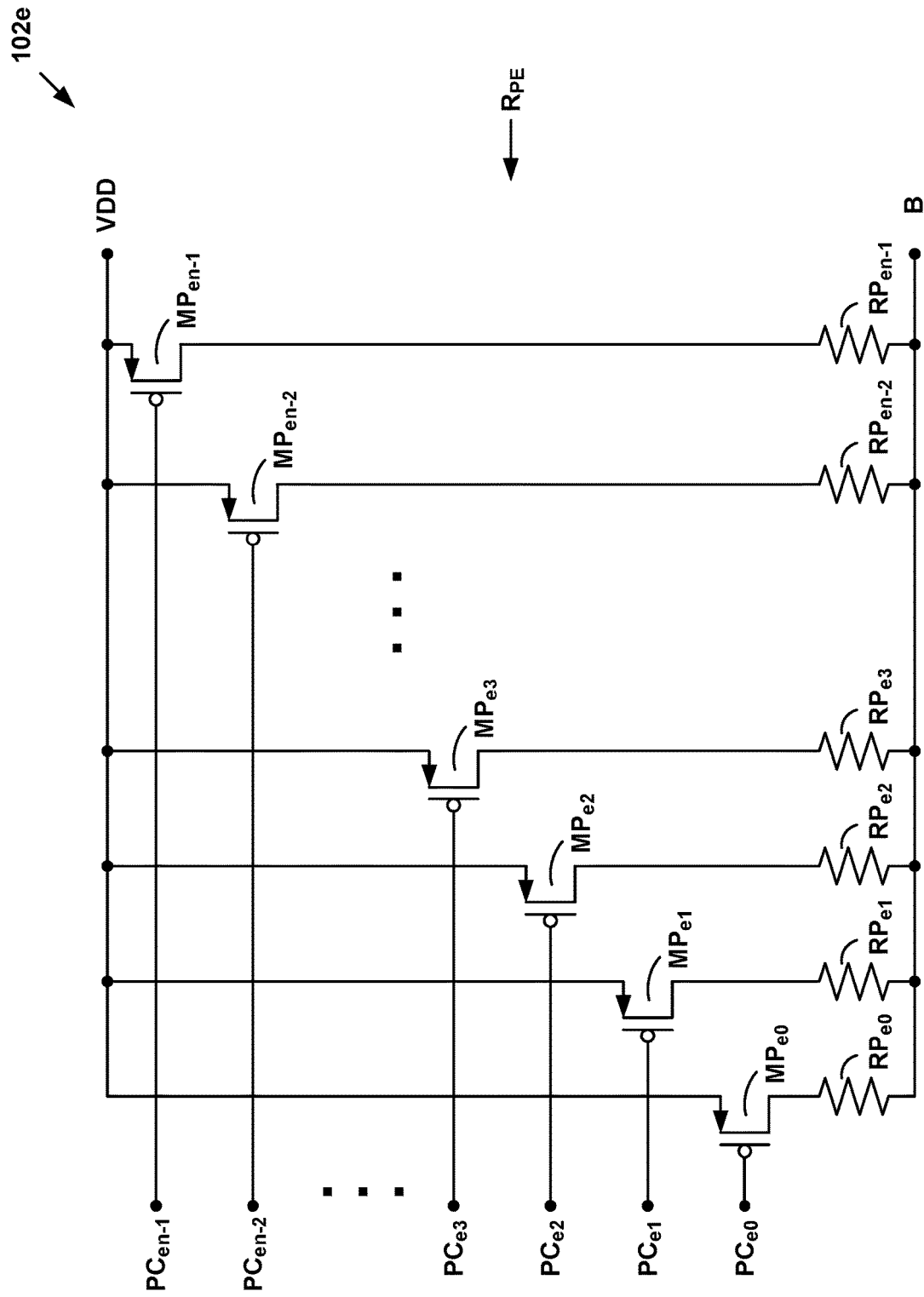
FIG. 3 is a diagram of an embodiment of a second pull-up driver circuit of FIG. 1.

FIG. 3 is a diagram of an embodiment of second pull-up driver circuit 102e of FIG. 1. In an embodiment, second pull-up driver circuit 102e is a replica of a pull-up driver circuit in an output buffer. Thus, second pull-up driver circuit 102e also may be referred to as a replica circuit. In an embodiment, second pull-up driver circuit 102e is a binary weighted replica pull-up driver circuit. In an embodiment, second pull-up driver circuit 102e is a replica of on-die termination.

Second pull-up driver circuit 102e includes n transistors $MP_{e0}$, $MP_{e1}$, $MP_{e2}$, ..., $MP_{en-1}$, and n resistors $RP_{e0}$, $RP_{e1}$, $RP_{e2}$, ..., $RP_{en-1}$. In an embodiment, transistors $MP_{e0}$, $MP_{e1}$, $MP_{e2}$, ..., $MP_{en-1}$ are p-channel transistors. Each of transistors $MP_{e0}$, $MP_{e1}$, $MP_{e2}$, ..., $MP_{en-1}$ has a first terminal (e.g., a source terminal) coupled to first power supply VDD, a second terminal (e.g., a gate terminal) coupled to a corresponding bit of second pull-up impedance code $PC_e$ (e.g., $PC_{e0}$, $PC_{e1}$, $PC_{e2}$, ..., $PC_{en-1}$, respectively), and a third terminal (e.g., a drain terminal) coupled to a first terminal of a corresponding one of resistors $RP_{e0}$, $RP_{e1}$, $RP_{e2}$, ..., $RP_{en-1}$, respectively. Each of resistors $RP_{e0}$, $RP_{e1}$, $RP_{e2}$, ..., $RP_{en-1}$ has a second terminal coupled to second calibration node B of FIG. 1.

In an embodiment, resistors $RP_{e0}$, $RP_{e1}$, $RP_{e2}$, ..., $RP_{en-1}$ are binary weighted resistors. For example, $RP_{e0}=R_{PE}$, $RP_{e1}=2\times R_{PE}$, $RP_{e2}=4\times R_{PE}$, ..., $RP_{en-1}=2^{n-1}\times R_{PE}$. In an embodiment, transistors $MP_{e0}$, $MP_{e1}$, $MP_{e2}$, ..., $MP_{en-1}$ have a binary-weighted channel width-to-length ratio. For example, transistor $MP_{e0}$ has a channel width-to-length ratio (W/L), transistor $MP_{e1}$ has a channel width-to-length ratio (W/L)/2, transistor $MP_{e2}$ has a channel width-to-length ratio (W/L)/4, ..., transistor $MP_{en-1}$ has a channel width-to-length ratio $(W/L)/2^{n-1}$. Other configurations of resistors $RP_{e0}$, $RP_{e1}$, $RP_{e2}$, ..., $RP_{en-1}$ and transistors $MP_{e0}$, $MP_{e1}$, $MP_{e2}$, ..., $MP_{en-1}$ may be used.

In an embodiment, impedance $R_{PE}$ of second pull-up driver circuit 102e varies in response to a value of second pull-up impedance code $PC_e$. In the embodiment of FIG. 3, the value of second pull-up impedance code $PC_e$ is used to select which of transistors $MP_{e0}$, $MP_{e1}$, $MP_{e2}$, ..., $MP_{en-1}$ are turned ON or OFF to control impedance $R_{PE}$ of second pull-up driver circuit 102e.

Figure 4:
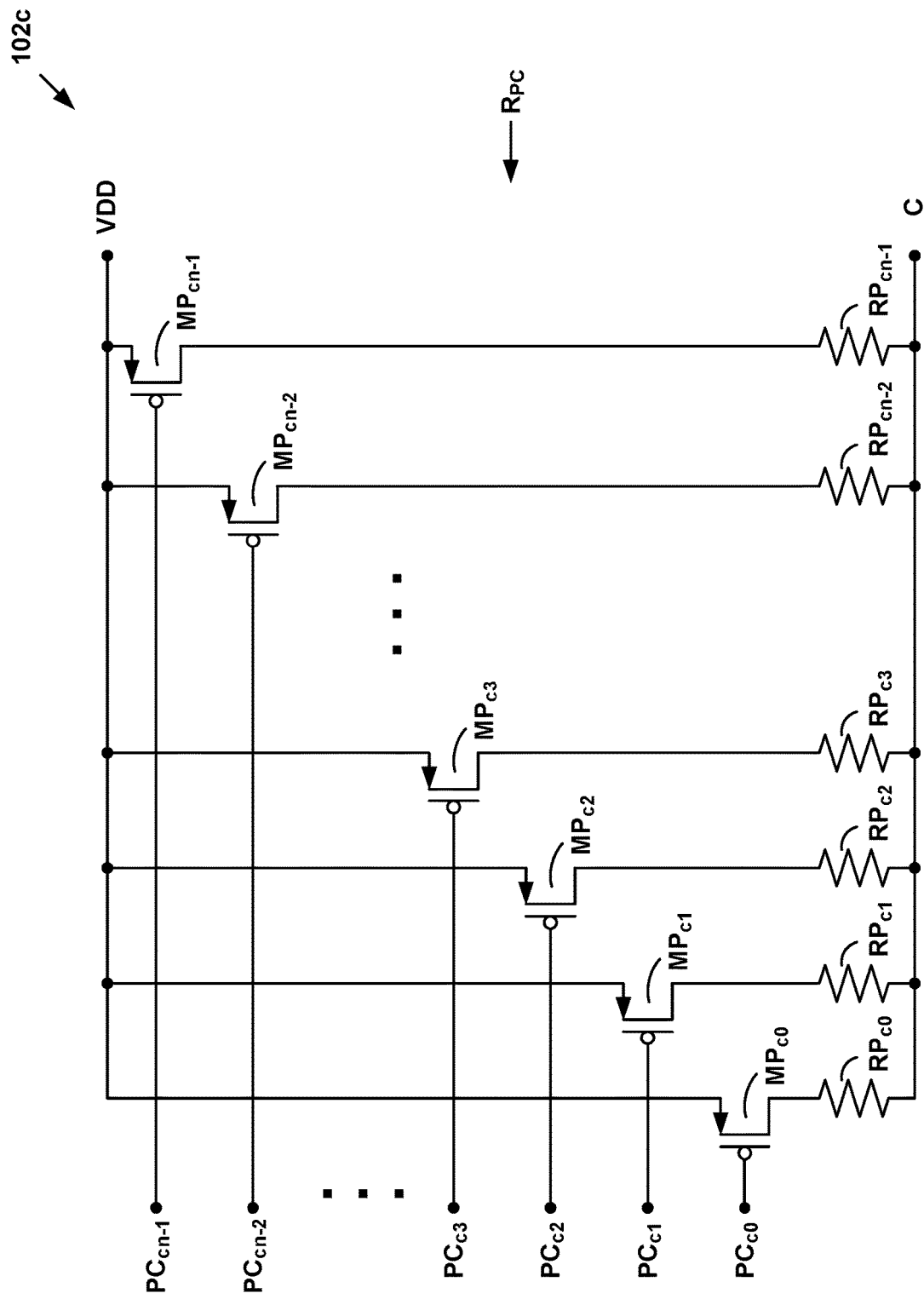
FIG. 4 is a diagram of an embodiment of a third pull-up driver circuit of FIG. 1.

FIG. 4 is a diagram of an embodiment of third pull-up driver circuit 102c of FIG. 1. In an embodiment, third pull-up driver circuit 102c is a replica of a pull-up driver circuit in an output buffer. Thus, third pull-up driver circuit 102c also may be referred to as a replica circuit. In an embodiment, third pull-up driver circuit 102c is a binary weighted replica pull-up driver circuit. In an embodiment, third pull-up driver circuit 102c is a replica of on-die termination.

Third pull-up driver circuit 102c includes n transistors $MP_{c0}$, $MP_{c1}$, $MP_{c2}$, ..., $MP_{cn-1}$, and n resistors $RP_{c0}$, $RP_{c1}$, $RP_{c2}$, ..., $RP_{cn-1}$. In an embodiment, transistors $MP_{c0}$, $MP_{c1}$, $MP_{c2}$, ..., $MP_{cn-1}$ are p-channel transistors. Each of transistors $MP_{c0}$, $MP_{c1}$, $MP_{c2}$, ..., $MP_{cn-1}$ has a first terminal (e.g., a source terminal) coupled to first power supply VDD, a second terminal (e.g., a gate terminal) coupled to a corresponding bit of third pull-up impedance code $PC_c$ (e.g., $PC_{c0}$, $PC_{c1}$, $PC_{c2}$, ..., $PC_{cn-1}$, respectively), and a third terminal (e.g., a drain terminal) coupled to a first terminal of a corresponding one of resistors $RP_{c0}$, $RP_{c1}$, $RP_{c2}$, ..., $RP_{cn-1}$, respectively. Each of resistors $RP_{c0}$, $RP_{c1}$, $RP_{c2}$, ..., $RP_{cn-1}$ has a second terminal coupled to third calibration node C of FIG. 1.

In an embodiment, resistors $RP_{c0}$, $RP_{c1}$, $RP_{c2}$, ..., $RP_{cn-1}$ are binary weighted resistors. For example, $RP_{c0}=R_{PC}$, $RP_{c1}=2\times R_{PC}$, $RP_{c2}=4\times R_{PC}$, ..., $RP_{cn-1}=2^{n-1}\times R_{PC}$. In an embodiment, transistors $MP_{c0}$, $MP_{c1}$, $MP_{c2}$, ..., $MP_{cn-1}$ have a binary-weighted channel width-to-length ratio. For example, transistor $MP_{c0}$ has a channel width-to-length ratio (W/L), transistor $MP_{c1}$ has a channel width-to-length ratio (W/L)/2, transistor $MP_{c2}$ has a channel width-to-length ratio (W/L)/4, ..., transistor $MP_{cn-1}$ has a channel width-to-length ratio $(W/L)/2^{n-1}$. Other configurations of resistors $RP_{c0}$, $RP_{c1}$, $RP_{c2}$, ..., $RP_{cn-1}$ and transistors $MP_{c0}$, $MP_{c1}$, $MP_{c2}$, ..., $MP_{cn-1}$ may be used.

In an embodiment, impedance $R_{PC}$ of third pull-up driver circuit 102c varies in response to a value of third pull-up impedance code $PC_c$. In the embodiment of FIG. 4, the value of third pull-up impedance code $PC_c$ is used to select which of transistors $MP_{c0}$, $MP_{c1}$, $MP_{c2}$, ..., $MP_{cn-1}$ are turned ON or OFF to control impedance $R_{PC}$ of third pull-up driver circuit 102c.

In an embodiment, third pull-up driver circuit 102c is substantially identical to first pull-up driver circuit 102i such that if third pull-up impedance code $PC_c$ is made equal to first pull-up impedance code $PC_i$, impedance $R_{PC}$ of third pull-up driver circuit 102c substantially equals impedance $R_{PI}$ of first pull-up driver circuit 102i.

In an embodiment, third pull-up driver circuit 102c is substantially identical to second pull-up driver circuit 102e such that if third pull-up impedance code $PC_c$ is made equal to second pull-up impedance code $PC_E$, impedance $R_{PC}$ of third pull-up driver circuit 102c substantially equals impedance $R_{PE}$ of second pull-up driver circuit 102e.

Figure 5:
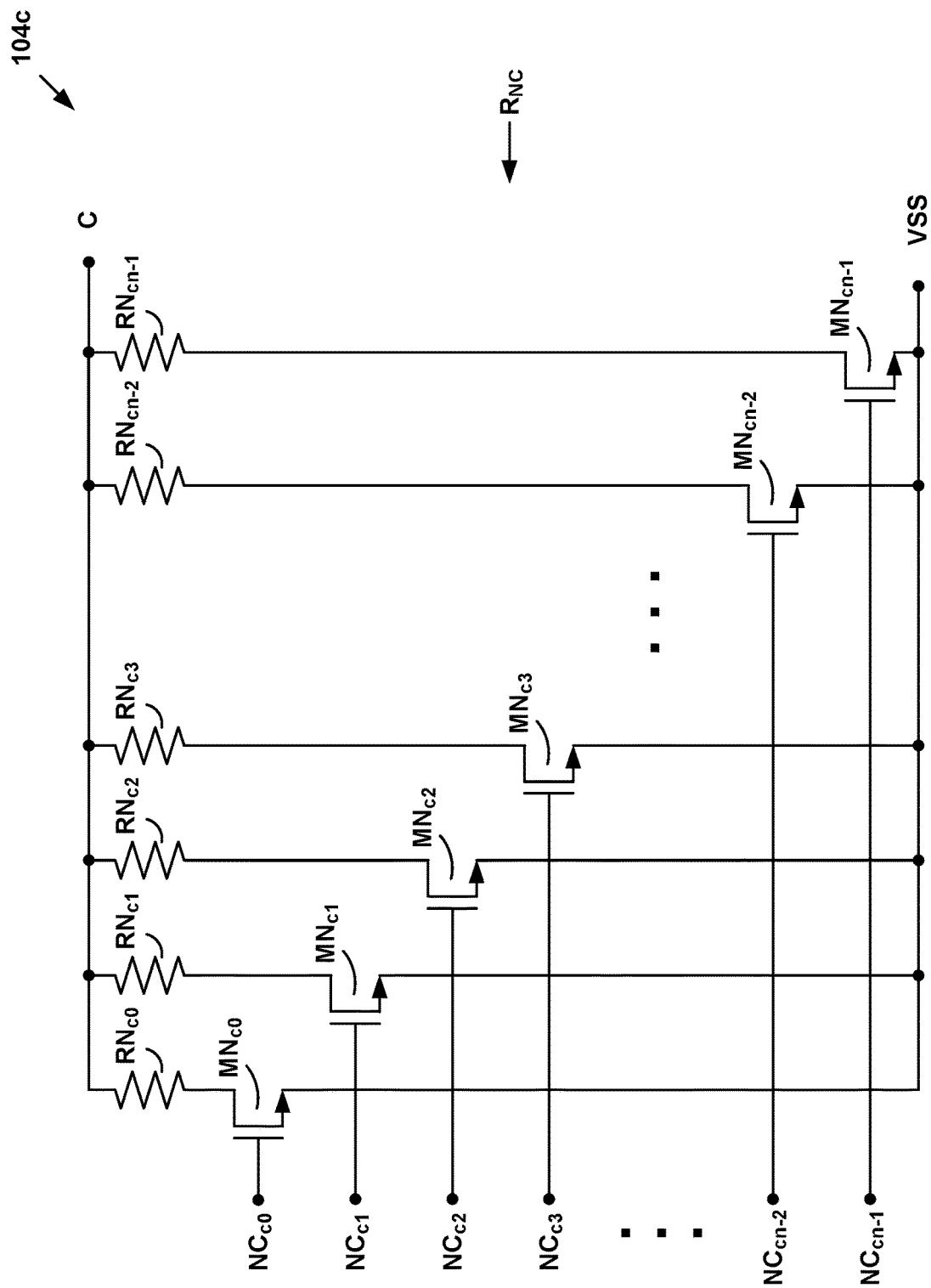
FIG. 5 is a diagram of an embodiment of a first pull-down driver circuit of FIG. 1.

FIG. 5 is a diagram of an embodiment of first pull-down driver circuit 104c of FIG. 1. In an embodiment, first pull-down driver circuit 104c is a replica of a pull-down driver circuit in an output buffer. Thus, first pull-down driver circuit 104c also may be referred to as a replica circuit. In an embodiment, first pull-down driver circuit 104c is a binary weighted replica pull-down driver circuit. In an embodiment, first pull-down driver circuit 104c is a replica of on-die termination.

First pull-down driver circuit 104c includes n transistors $MN_{c0}$, $MN_{c1}$, $MN_{c2}$, ..., $MN_{cn-1}$, and n resistors $RN_{c0}$, $RN_{c1}$, $RN_{c2}$, ..., $RN_{cn-1}$. In an embodiment, transistors $MN_{c0}$, $MN_{c1}$, $MN_{c2}$, ..., $MN_{cn-1}$ are n-channel transistors. Each of transistors $MN_{c0}$, $MN_{c1}$, $MN_{c2}$, ..., $MN_{cn-1}$ has a first terminal (e.g., a drain terminal) coupled to a first terminal of a corresponding one of resistors $RN_{c0}$, $RN_{c1}$, $RN_{c2}$, ..., $RN_{cn-1}$, respectively, a second terminal (e.g., a gate terminal) coupled to a corresponding bit of third pull-down impedance code $NC_c$ (e.g., $NC_{c0}$, $NC_{c1}$, $NC_{c2}$, ..., $NC_{cn-1}$, respectively), and a third terminal (e.g., a source terminal) coupled to second power supply VSS. Each of resistors $RN_{c0}$, $RN_{c1}$, $RN_{c2}$, ..., $RN_{cn-1}$ has a second terminal coupled to third calibration node C of FIG. 1.

In an embodiment, resistors $RN_{c0}$, $RN_{c1}$, $RN_{c2}$, ..., $RN_{cn-1}$ are binary weighted resistors. For example, $RN_{c0}=R_{NC}$, $RN_{c1}=2\times R_{NC}$, $RN_{c2}=4\times R_{NC}$, ..., $RN_{cn-1}=2^{n-1}\times R_{NC}$. In an embodiment, transistors $MN_{c0}$, $MN_{c2}$, $MN_{c3}$, ..., $MN_{cn-1}$ have a binary-weighted channel width-to-length ratio. For example, transistor $MN_{c0}$ has a channel width-to-length ratio (W/L), transistor $MN_{c1}$ has a channel width-to-length ratio (W/L)/2, transistor $MN_{c2}$ has a channel width-to-length ratio (W/L)/4, ..., transistor $MN_{cn-1}$ has a channel width-to-length ratio $(W/L)/2^{n-1}$. Other configurations of resistors $RN_{c0}$, $RN_{c1}$, $RN_{c2}$, ..., $RN_{cn-1}$ and transistors $MN_{c0}$, $MN_{c1}$, $MN_{c2}$, ..., $MN_{cn-1}$ may be used.

In an embodiment, impedance $R_{NC}$ of first pull-down driver circuit 104c varies in response to a value of first pull-down impedance code $NC_c$. In the embodiment of FIG. 5, the value of first pull-down impedance code $NC_c$ is used to select which of transistors $MN_{c0}$, $MN_{c1}$, $MN_{c2}$, ..., $MN_{cn-1}$ are turned ON or OFF to control impedance $R_{NC}$ of first pull-down driver circuit 104c.

Figure 6:
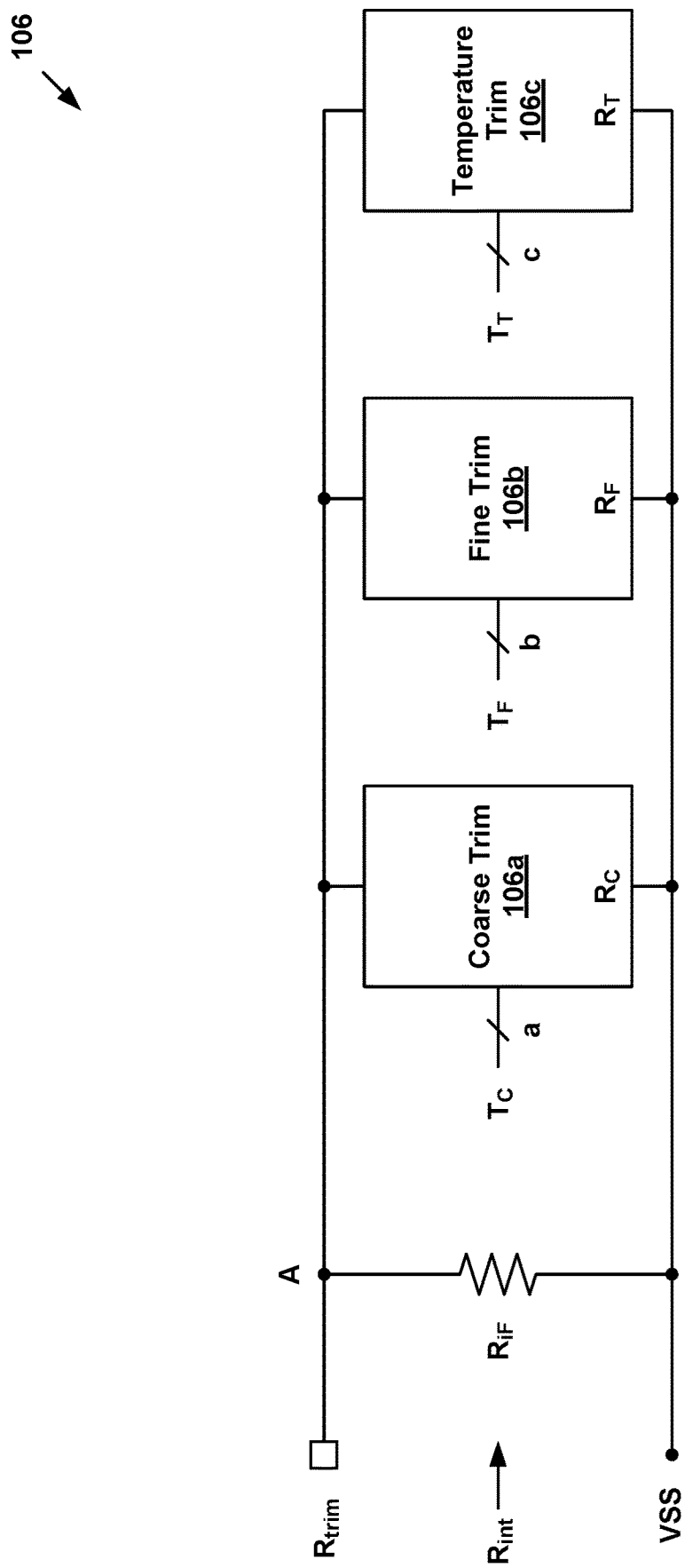
FIG. 6 is a diagram of an embodiment of an internal resistor circuit of FIG. 1.

FIG. 6 is a diagram of an embodiment of internal resistor circuit 106 of FIG. 1. Internal resistor circuit 106 includes a fixed resistor $R_{iF}$, a coarse trim circuit 106a, a fine trim circuit 106b, and a temperature trim circuit 106c all disposed in parallel with one another and coupled to first calibration node A and second power supply VSS. As used herein, the term "fixed resistor" means that resistor $R_{iF}$ is continually coupled to first calibration node A and second power supply VSS. That is, resistor $R_{iF}$ is not selectively coupled to first calibration node A and/or second power supply VSS via switches, etc.

In an embodiment, resistor $R_{iF}$ includes a first terminal coupled to first calibration node A and first pad $R_{trim}$, and a second terminal coupled to second power supply VSS. In an embodiment, resistor $R_{iF}$ has an impedance (e.g., 250 Ω or some other value) on a same order of magnitude as a desired impedance of third pull-up driver circuit and first pull-down driver circuit. In contrast, previously known ZQ calibration systems include internal resistor circuits that include resistors having magnitudes much larger than a desired impedance of third pull-up driver circuit and first pull-down driver circuit.

In an embodiment, coarse trim circuit 106a has an impedance $R_C$, fine trim circuit 106b has an impedance $R_F$, and temperature trim circuit 106c has an impedance $R_T$. In an embodiment, impedance $R_C$, impedance $R_F$, and impedance $R_T$ are each on the order of KΩ or some other value greater than the impedance of resistor $R_{iF}$.

In an embodiment, ZQ calibration logic is configured to vary impedance $R_C$ of coarse trim circuit 106a and impedance $R_F$ of fine trim circuit 106b (which are disposed in parallel with resistor $R_{iF}$) to trim impedance $R_{int}$ of internal resistor circuit 106.

In an embodiment, temperature correction circuit 114 is configured to vary impedance $R_T$ of temperature trim circuit 106c (which is disposed in parallel with resistor $R_{iF}$) to compensate for temperature variations of resistor $R_{iF}$ of internal resistor circuit 106.

In an embodiment, impedance $R_{int}$ of internal resistor circuit 106 may be determined as set forth in the following equation (1):

$$\frac{1}{R_{int}} = \frac{1}{R_{iF}} + \frac{1}{R_C} + \frac{1}{R_F} + \frac{1}{R_T} \qquad (1)$$

In an embodiment, coarse trim circuit 106a includes a first terminal coupled to first calibration node A and first pad $R_{trim}$, a second terminal coupled to first impedance trim code $T_C$, and a third terminal coupled to second power supply VSS. As described in more detail below, in an embodiment coarse trim circuit 106a includes a number of transistors and resistors, and impedance $R_C$ of coarse trim circuit 106a varies in response to a value of first impedance trim code $T_C$. As described in more detail below, in an embodiment first impedance trim code $T_C$ may be used to vary impedance $R_C$ of coarse trim circuit 106a to perform a coarse trim of impedance $R_{int}$ of temperature trim circuit 106c.

In an embodiment, fine trim circuit 106b includes a first terminal coupled to first calibration node A and first pad $R_{trim}$, a second terminal coupled to second impedance trim code $T_F$, and a third terminal coupled to second power supply VSS. As described in more detail below, in an embodiment fine trim circuit 106b includes a number of transistors and resistors, and impedance $R_F$ of fine trim circuit 106b varies in response to a value of second impedance trim code $T_F$. As described in more detail below, in an embodiment second impedance trim code $T_F$ may be used to vary impedance $R_F$ of fine trim circuit 106b to perform a coarse trim of impedance $R_{int}$ of temperature trim circuit 106c.

In an embodiment, temperature trim circuit 106c includes a first terminal coupled to first calibration node A and first pad $R_{trim}$, a second terminal coupled to third impedance trim code $T_T$, and a third terminal coupled to second power supply VSS. As described in more detail below, in an embodiment temperature trim circuit 106c includes a number of transistors and resistors, and impedance $R_T$ of temperature trim circuit 106c varies in response to a value of third impedance trim code $T_T$. As described in more detail below, in an embodiment third impedance trim code $T_T$ may be used to vary impedance $R_T$ of temperature trim circuit 106c to compensate for temperature variations of impedance $R_{int}$ of temperature trim circuit 106c.

In an embodiment, a trimmed impedance $R_{int}$ of internal resistor circuit 106 substantially equals impedance $R_{ext}$ of external resistor 118.

Figure 7A:
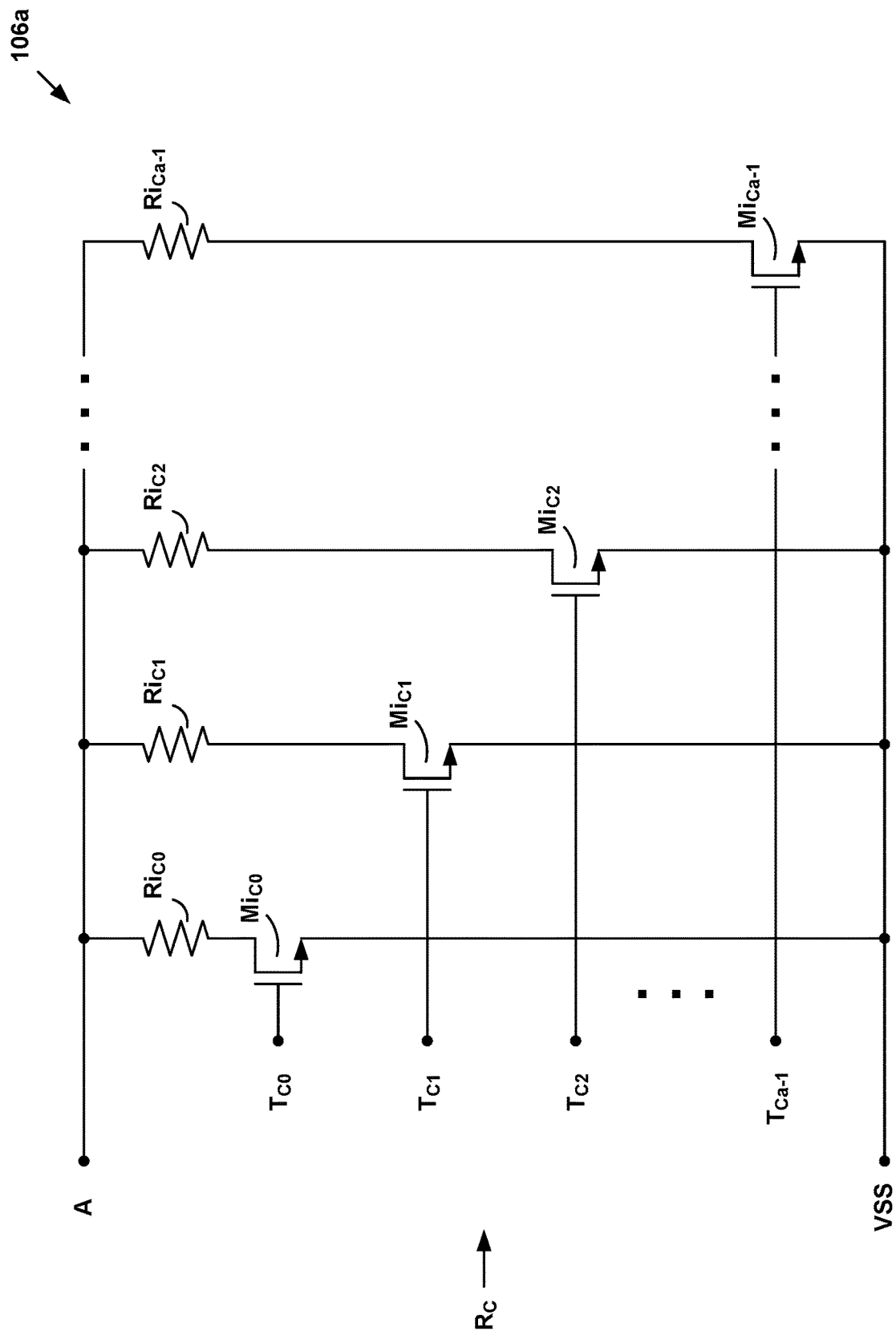
FIG. 7A is a diagram of an embodiment of a coarse trim circuit of FIG. 6.

FIG. 7A is a diagram of an embodiment of coarse trim circuit 106a of FIG. 6. In an embodiment, coarse trim circuit 106a is a binary weighted variable impedance circuit. As described in more detail below, in an embodiment impedance $R_C$ of coarse trim circuit 106a varies in response to a value of first impedance trim code $T_C$.

Coarse trim circuit 106a includes transistors $Mi_{C0}$, $Mi_{C1}$, $Mi_{C2}$, ..., $Mi_{Ca-1}$, and a resistors $Ri_{C0}$, $Ri_{C1}$, $Ri_{C2}$, ..., $Ri_{Ca-1}$. In an embodiment, transistors $Mi_{C0}$, $Mi_{C1}$, $Mi_{C2}$, ..., $Mi_{Ca-1}$ are n-channel transistors. Each of transistors $Mi_{C0}$, $Mi_{C1}$, $Mi_{C2}$, ..., $Mi_{Ca-1}$ has a first terminal (e.g., a drain terminal) coupled to a first terminal of a corresponding one of resistors $Ri_{C0}$, $Ri_{C1}$, $Ri_{C2}$, ..., $Ri_{Ca-1}$, respectively, a second terminal (e.g., a gate terminal) coupled to a corresponding bit of first impedance code $T_C$ (e.g., $T_{C0}$, $T_{C1}$, $T_{C2}$, ..., $T_{Ca-1}$, respectively), and a third terminal (e.g., a source terminal) coupled to second power supply VSS. Each of resistors $Ri_{C0}$, $Ri_{C1}$, $Ri_{C2}$, ..., $Ri_{Ca-1}$ has a second terminal coupled to first calibration node A of FIG. 1.

In an embodiment, resistors $Ri_{C0}$, $Ri_{C1}$, $Ri_{C2}$, ..., $Ri_{Ca-1}$ are binary weighted resistors. For example, $Ri_{C0}=R_\alpha$, $Ri_{C1}=2\times R_\alpha$, $Ri_{C2}=4\times R_\alpha$, ..., $Ri_{Ca-1}=2^{a-1}\times R_\alpha$, where $R_\alpha$ is a most significant bit resistance value of coarse trim circuit 106a. In an embodiment, transistors $Mi_{C0}$, $Mi_{C1}$, $Mi_{C2}$, ..., $Mi_{Ca-1}$ have a binary-weighted channel width-to-length ratio. For example, transistor $Mi_{C0}$ has a channel width-to-length ratio (W/L), transistor $Mi_{C1}$ has a channel width-to-length ratio (W/L)/2, transistor $Mi_{C2}$ has a channel width-to-length ratio (W/L)/4, ..., transistor $Mi_{Ca-1}$ has a channel width-to-length ratio $(W/L)/2^{a-1}$. Other configurations of resistors $Ri_{C0}$, $Ri_{C1}$, $Ri_{C2}$, ..., $Ri_{Ca-1}$ and transistors $Mi_{C0}$, $Mi_{C1}$, $Mi_{C2}$, ..., $Mi_{Ca-1}$ may be used.

In an embodiment, impedance $R_C$ of coarse trim circuit 106a varies in response to a value of first impedance code $T_C$. In the embodiment of FIG. 7A, the value of first impedance code $T_C$ is used to select which of transistors $Mi_{C0}$, $Mi_{C1}$, $Mi_{C2}$, ..., $Mi_{Ca-1}$ are turned ON or OFF to control impedance $R_C$ of coarse trim circuit 106a.

Figure 7B:
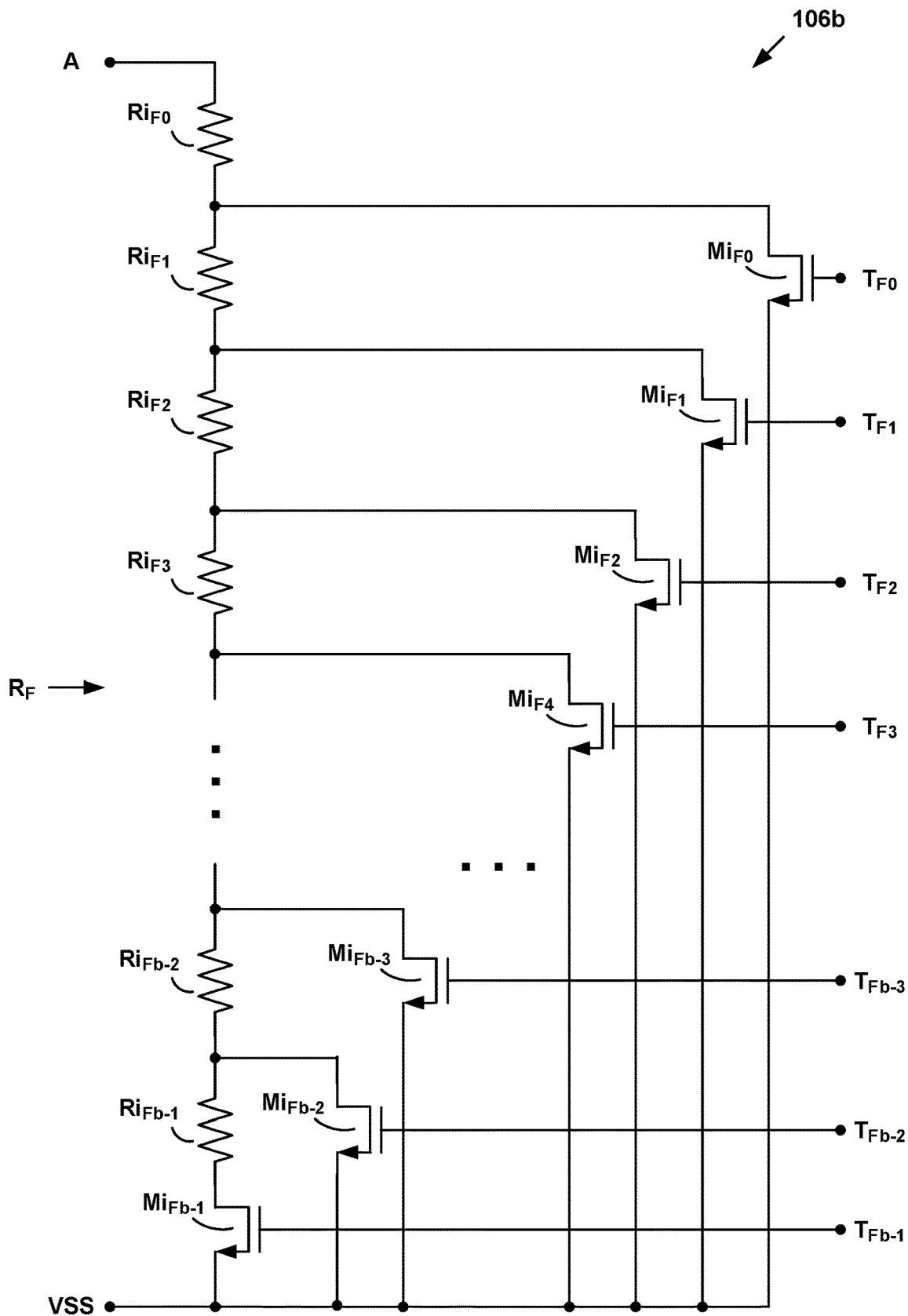
FIG. 7B is a diagram of an embodiment of a fine trim circuit of FIG. 6.

FIG. 7B is a diagram of an embodiment of fine trim circuit 106b of FIG. 6. As described in more detail below, in an embodiment impedance $R_F$ of fine trim circuit 106b varies in response to a value of second impedance trim code $T_F$.

Fine trim circuit 106b includes transistors $Mi_{F0}$, $Mi_{F1}$, $Mi_{F2}$, ..., $Mi_{Fb-1}$, and a resistors $Ri_{F0}$, $Ri_{F1}$, $Ri_{F2}$, ..., $Ri_{Fb-1}$. In an embodiment, transistors $Mi_{F0}$, $Mi_{F1}$, $Mi_{F2}$, ..., $Mi_{Fb-1}$ are n-channel transistors. Resistors $Ri_{F0}$, $Ri_{F1}$, $Ri_{F2}$, ..., $Ri_{Fb-1}$ are coupled in series and each has a first terminal and a second terminal. The first terminal of resistor $Ri_{F0}$, is coupled to first calibration node A of FIG. 1. The first terminal of resistors $Ri_{F1}$, $Ri_{F2}$, $Ri_{F3}$, ..., $Ri_{Fb-1}$ is coupled to a corresponding second terminal of resistors $Ri_{F0}$, $Ri_{F1}$, $Ri_{F2}$, ..., $Ri_{Fb-2}$, respectively.

Each of transistors $Mi_{F0}$, $Mi_{F1}$, $Mi_{F2}$, ..., $Mi_{Fb-1}$ has a first terminal (e.g., a drain terminal) coupled to a second terminal of a corresponding one of resistors $Ri_{F0}$, $Ri_{F1}$, $Ri_{F2}$, ..., $Ri_{Fb-1}$, respectively, a second terminal (e.g., a gate terminal) coupled to a corresponding bit of second impedance code $T_F$ (e.g., $T_{F0}$, $T_{F1}$, $T_{F2}$, ..., $T_{Fb-1}$, respectively), and a third terminal (e.g., a source terminal) coupled to second power supply VSS.

In an embodiment, resistors $Ri_{F0}$, $Ri_{F1}$, $Ri_{F2}$, ..., $Ri_{Fb-1}$ have a same impedance value. For example, $Ri_{F0}=Ri_{F1}=Ri_{F2}=\ldots=Ri_{Fb-1}=R_\beta$, where $R_\beta$ is a least significant bit resistance value of fine trim circuit 106b. In an embodiment, transistors $Mi_{F0}$, $Mi_{F1}$, $Mi_{F2}$, ..., $Mi_{Fb-1}$ have a same channel width-to-length ratio. Other configurations of resistors $Ri_{F0}$, $Ri_{F1}$, $Ri_{F2}$, ..., $Ri_{Fb-1}$ and transistors $Mi_{F0}$, $Mi_{F1}$, $Mi_{F2}$, ..., $Mi_{Fb-1}$ may be used.

In an embodiment, impedance $R_F$ of fine trim circuit 106b varies in response to a value of second impedance code $T_F$. In the embodiment of FIG. 7B, the value of second impedance code $T_F$ is used to select which of transistors $Mi_{F0}$, $Mi_{F1}$, $Mi_{F2}$, ..., $Mi_{Fb-1}$ are turned ON or OFF to control impedance $R_F$ of fine trim circuit 106b.

Figure 7C:
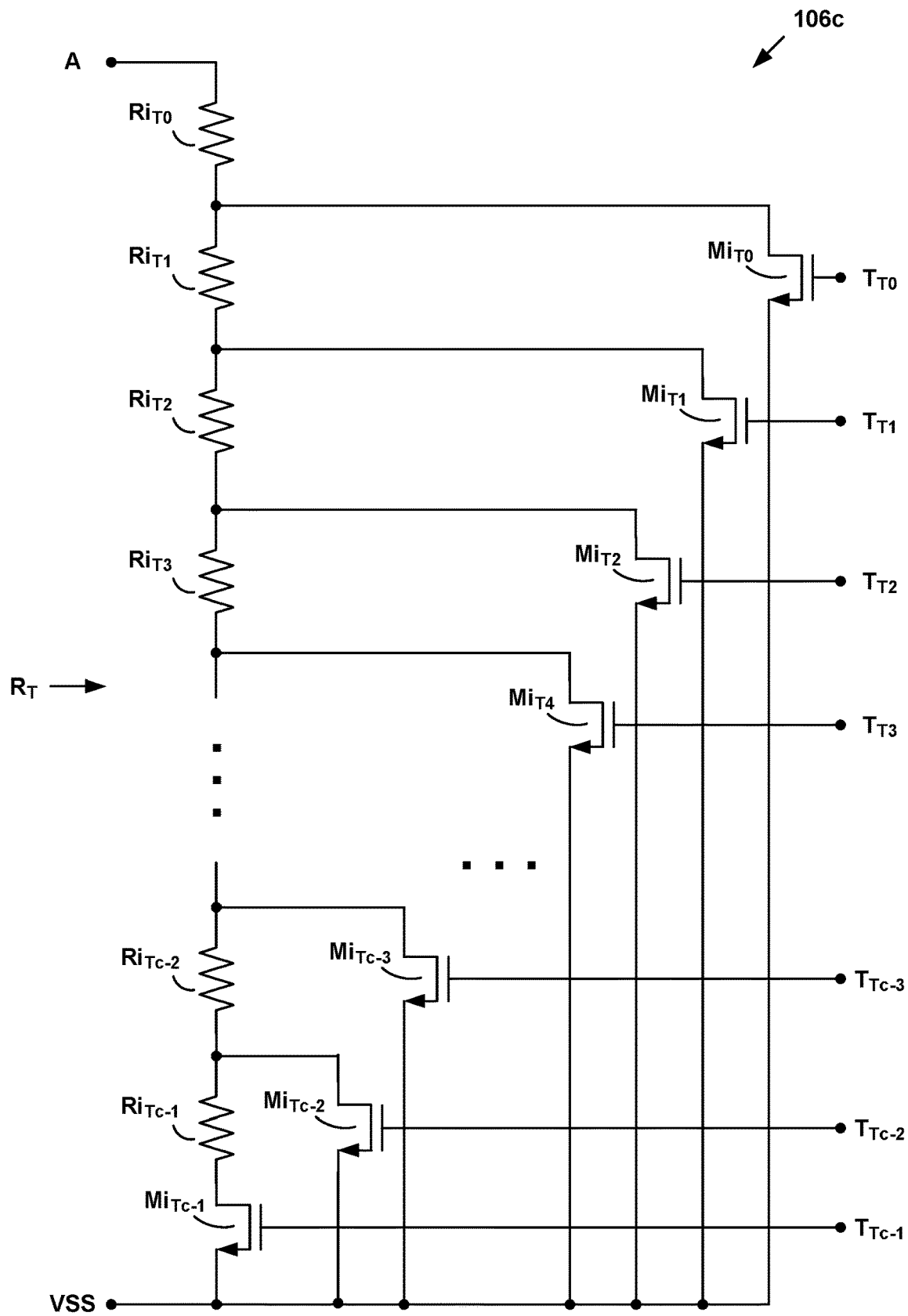
FIG. 7C is a diagram of an embodiment of a temperature trim circuit of FIG. 6.

FIG. 7C is a diagram of an embodiment of temperature trim circuit 106c of FIG. 6. As described in more detail below, in an embodiment impedance $R_T$ of temperature trim circuit 106c varies in response to a value of third impedance trim code $T_T$.

Temperature trim circuit 106c includes transistors $Mi_{T0}$, $Mi_{T1}$, $Mi_{T2}$, ..., $Mi_{Tc-1}$, and a resistors $Ri_{T0}$, $Ri_{T1}$, $Ri_{T2}$, ..., $Ri_{Tc-1}$. In an embodiment, transistors $Mi_{T0}$, $Mi_{T1}$, $Mi_{T2}$, ..., $Mi_{Tc-1}$ are n-channel transistors. Resistors $Ri_{T0}$, $Ri_{T1}$, $Ri_{T2}$, ..., $Ri_{Tc-1}$ are coupled in series and each has a first terminal and a second terminal. The first terminal of resistor $Ri_{T0}$, is coupled to first calibration node A of FIG. 1. The first terminal of resistors $Ri_{T1}$, $Ri_{T2}$, $Ri_{T3}$, ..., $Ri_{Tc-1}$ is coupled to a corresponding second terminal of resistors $Ri_{T0}$, $Ri_{T1}$, $Ri_{T2}$, ..., $Ri_{Tc-2}$, respectively.

Each of transistors $Mi_{T0}$, $Mi_{T1}$, $Mi_{T2}$, ..., $Mi_{Tc-1}$ has a first terminal (e.g., a drain terminal) coupled to a second terminal of a corresponding one of resistors $Ri_{T0}$, $Ri_{T1}$, $Ri_{T2}$, ..., $Ri_{Tc-1}$, respectively, a second terminal (e.g., a gate terminal) coupled to a corresponding bit of third impedance code $T_T$ (e.g., $T_{T0}$, $T_{T1}$, $T_{T2}$, ..., $T_{Tc-1}$, respectively), and a third terminal (e.g., a source terminal) coupled to second power supply VSS.

In an embodiment, resistors $Ri_{T0}$, $Ri_{T1}$, $Ri_{T2}$, ..., $Ri_{Tc-1}$ have a same impedance value. For example, $Ri_{T0}=Ri_{T1}=Ri_{T2}=\ldots=Ri_{Tc-1}=R_\gamma$, where $R_\gamma$ is a least significant bit resistance value of temperature trim circuit 106c. In an embodiment, transistors $Mi_{T0}$, $Mi_{T1}$, $Mi_{T2}$, ..., $Mi_{Tc-1}$ have a same channel width-to-length ratio. Other configurations of resistors $Ri_{T0}$, $Ri_{T1}$, $Ri_{T2}$, ..., $Ri_{Tc-1}$ and transistors $Mi_{T0}$, $Mi_{T1}$, $Mi_{T2}$, ..., $Mi_{Tc-1}$ may be used.

In an embodiment, impedance $R_T$ of temperature trim circuit 106c varies in response to a value of third impedance code $T_T$. In the embodiment of FIG. 7C, the value of third impedance code $T_T$ is used to select which of transistors $Mi_{T0}$, $Mi_{T1}$, $Mi_{T2}$, ..., $Mi_{Tc-1}$ are turned ON or OFF to control impedance $R_T$ of temperature trim circuit 106c.

In an embodiment, values of resistor $R_{iF}$, most significant bit resistance value $R_\alpha$ of coarse trim circuit 106a, least significant bit resistance value $R_\beta$ of fine trim circuit 106b, and least significant bit resistance value $R_\gamma$ of temperature trim circuit 106c may be determined as follows:

$$R_{iF} = \frac{R_{int}}{(1-v)} \quad (2)$$

$$R_\alpha = \frac{R_{iF} \times R_{int} \times (1+v)}{(2^a - 1) \times [R_{iF} \times (1+v) - R_{int}]} \quad (3)$$

$$R_\beta = \frac{b \times R_{int} \times (1-e)}{e} \quad (4)$$

$$R_\gamma = \frac{c \times R_{int} \times (1-e)}{e} \quad (5)$$

$$\frac{R_\alpha}{(2^a - 1)} > R_\beta \times (2^a - 1) \quad (6)$$

$$R_\gamma < \frac{R_{int} \times K \times 0.5 \times (T_{max} - T_{min})}{[K \times 0.5 \times (T_{max} - T_{min})] - 1} \quad (7)$$

where $R_{int}$ is a desired impedance of internal resistor circuit 106, v=resistor variation (in %) across process, a=the number of calibration bits of coarse trim circuit 106a, b=the number of calibration bits of fine trim circuit 106b, c=the number of calibration bits of temperature trim circuit 106c, e=a step error (in %), K=a temperature coefficient of resistor $R_{iF}$ per degree Celsius, $T_{max}$ is a maximum operating temperature value in Celsius and $T_{min}$ is a maximum operating temperature value in Celsius.

Persons of ordinary skill in the art will understand that other techniques may be used to determine values for resistor $R_{iF}$, most significant bit resistance value $R_\alpha$ of coarse trim circuit 106a, least significant bit resistance value $R_\beta$ of fine trim circuit 106b, and least significant bit resistance value $R_\gamma$ of temperature trim circuit 106c.

Figure 8:
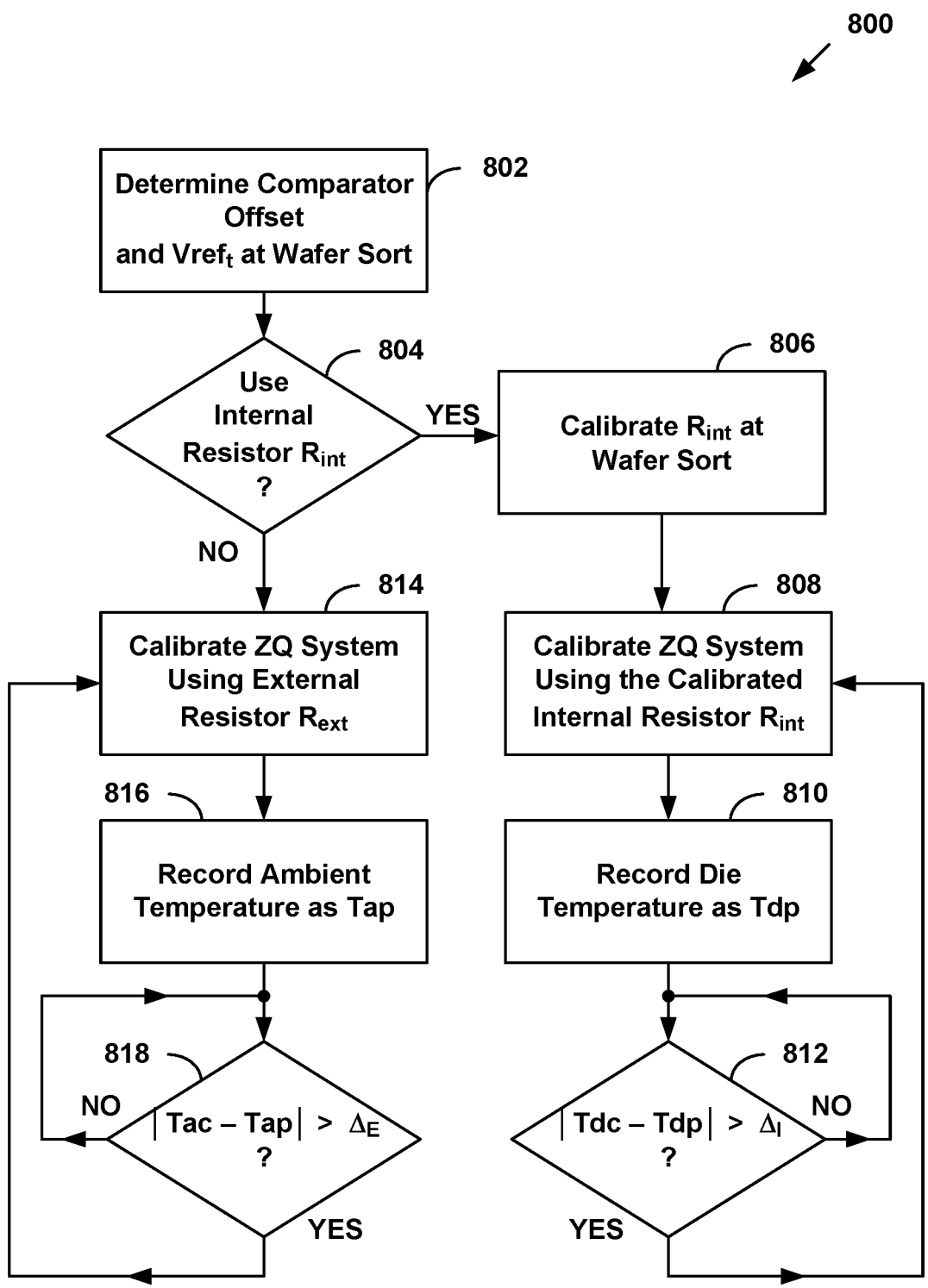
FIG. 8 is a flowchart of an embodiment of a process for operation of dual reference ZQ calibration system of FIG. 1.

FIG. 8 is a flowchart of an embodiment of a process 800 for operation of dual reference ZQ calibration system 100. The description of process 800 will refer to elements in FIGS. 1-7C, but process 800 also may be used with other circuitry to achieve the same result. The steps of process 800 are described in an example order, but the steps may not performed in the exact order depicted in FIG. 8.

At step 802, an offset voltage of comparator 110 and trimmed reference voltage $Vref_t$ are determined. In an embodiment, step 802 is performed at wafer sort. In an embodiment, ZQ calibration logic 116 generates second pull-up impedance code $PC_e$ to turn OFF all transistors in second pull-up driver circuit 102e. In an embodiment, external voltage source $V_{ext}$ is coupled to second pad $R_eV_o$, and MUX 108 couples second calibration node B to first input terminal $V_1$ of comparator 110.

In an embodiment, external voltage source $V_{ext}$ is set to desired magnitude $Vref_d$ (e.g., VDD/2 or VDD/3). In an embodiment, offset correction block 112 sweeps through various voltage values to determine a switching voltage $V_s$ at which output signal $CMP_o$ of comparator 110 switches. In an embodiment, switching voltage $V_s$ is a voltage that compensates for an offset voltage of comparator 110 and error in generating a reference voltage for comparator 110. In an embodiment, offset correction block 112 saves the determined switching voltage $V_s$ as trimmed reference voltage $Vref_t$. In an embodiment, after saving the determined switching voltage $V_s$ as trimmed reference voltage $Vref_t$, external voltage source $V_{ext}$ is disconnected from second pad $R_eV_o$.

As described above, dual reference ZQ calibration system 100 may be used to perform ZQ calibration using either internal resistor circuit 106 or an external resistor 118. At step 804, a determination is made whether internal resistor 106 will be used for ZQ calibration.

If at step 804 a determination is made that internal resistor 106 will be used for ZQ calibration, at step 806 internal resistor 106 is calibrated to a desired value $R_d$ (e.g., 200 Ω or some other desired value). In an embodiment, step 806 is performed at wafer sort. In an embodiment, external current source $I_{ext}$ is coupled to first pad $R_{trim}$. In an embodiment, external current source $I_{ext}$ has a magnitude of $V_{refd}/R_d$.

In an embodiment, ZQ calibration logic 116 generates first pull-up impedance code $PC_i$ to turn OFF all transistors in first pull-up driver circuit 102i. In an embodiment, MUX 108 couples first calibration node A to first input terminal $V_1$ of comparator 110, and offset correction block 112 provides trimmed reference voltage $Vref_t$ at second input terminal $V_1$ of comparator 110.

In an embodiment, ZQ calibration logic 116 receives output signal $CMP_o$ from comparator 110 and operates to determine first impedance trim code $T_C$ values and second impedance trim code $T_F$ values that trim impedance $R_{int}$ of internal resistor circuit 106 to desired value $R_d$. In an embodiment, step 806 is performed at a first temperature (e.g., room temperature). In an embodiment, ZQ calibration logic 116 saves the determined first impedance trim code $T_C$ values and second impedance trim code $T_F$ values, and external current source $I_{ext}$ is disconnected from first pad $R_{trim}$.

At step 808, dual reference ZQ calibration system 100 is calibrated using the trimmed reference voltage $Vref_t$ determined at step 802 and the trimmed impedance $R_{int}$ of internal resistor circuit 106. In an embodiment, offset correction block 112 provides trimmed reference voltage $Vref_t$ at second input terminal $V_1$ of comparator 110 and ZQ calibration logic 116 provides internal resistor circuit 106 with the first impedance trim code $T_C$ values and second impedance trim code $T_F$ values determined at step 806. In an embodiment, temperature correction circuit 114 provides third impedance trim code $T_t$ based on a die temperature to adapt or trim impedance $R_{int}$ of internal resistor circuit 106 to compensate for die temperature variations.

In an embodiment, MUX 108 couples first calibration node A to first input terminal $V_1$ of comparator 110, and ZQ calibration logic 116 operates to determine first pull-up impedance code $PC_i$ values that calibrate impedance $R_{PI}$ of first pull-up driver circuit 102i to trimmed impedance $R_{int}$ of internal resistor circuit 106. In an embodiment, ZQ calibration logic 116 then sets third pull-up impedance code $PC_c$ values to the determined first pull-up impedance code $PC_i$ values. As a result, impedance $R_{PC}$ of third pull-up driver circuit 102c is calibrated to trimmed impedance $R_{int}$ of internal resistor circuit 106.

In an embodiment, MUX 108 couples third calibration node C to first input terminal $V_1$ of comparator 110, and ZQ calibration logic 116 operates to determine first pull-down impedance code $NC_c$ values that calibrate impedance $R_{NC}$ of first pull-down driver circuit 104c to impedance $R_{PC}$ of third pull-up driver circuit 102c. Thus, after completing step 808, impedance $R_{PC}$ of third pull-up driver circuit 102c and impedance $R_{NC}$ of first pull-down driver circuit 104c are both calibrated to trimmed impedance $R_{int}$ of internal resistor circuit 106.

In an embodiment, the ZQ calibration of step 808 is performed on power up. After power-up the die temperature may increase or decrease during operation. As described above, in an embodiment, temperature correction circuit 114 provides third impedance trim code $T_t$ based on a die temperature to adapt or trim impedance $R_{int}$ of internal resistor circuit 106 to compensate for die temperature variations. In an embodiment, ZQ calibration of step 808 may be repeated if the die temperature changes by a predetermined amount from the die temperature at which ZQ calibration of step 808 was previously performed.

In particular, at step 810 a die temperature at which step 808 was performed is recorded as previous die temperature Tdp. At step 812, a determination is made if the magnitude of the difference between the current die temperature Tdc and previous die temperature Tdp is greater than a threshold amount $\Delta_I$ (e.g., $\Delta_I$=15° C. or some other amount).

If at step 812 a determination is made that the magnitude of the difference between the current die temperature Tdc and previous die temperature Tdp is not greater than threshold amount $\Delta_I$, step 812 is repeated. If at step 812 a determination is made that the magnitude of the difference between the current die temperature Tdc and previous die temperature Tdp is greater than threshold amount $\Delta_I$, then a ZQ calibration of step 808 is repeated. Without wanting to be bound by any particular theory, it is believed that repeating the ZQ calibration step based on die temperature variations will improve ZQ calibration accuracy.

Referring again to step 804, if a determination is made that internal resistor 106 will not be used for ZQ calibration, at step 814 dual reference ZQ calibration system 100 is calibrated using the trimmed reference voltage $Vref_t$ determined at step 802 and an external resistor 118 coupled to second pad $R_eV_o$. In an embodiment, offset correction block 112 provides trimmed reference voltage $Vref_t$ at second input terminal $V_1$ of comparator 110, and MUX 108 couples second calibration node B to first input terminal $V_1$ of comparator 110.

In an embodiment, ZQ calibration logic 116 operates to determine second pull-up impedance code $PC_e$ values that calibrate impedance $R_{PE}$ of second pull-up driver circuit 102e to the impedance $R_{ext}$ of external resistor 118. In an embodiment, ZQ calibration logic 116 then sets third pull-up impedance code $PC_c$ values to the determined second pull-up impedance code $PC_e$ values. As a result, impedance $R_{PC}$ of third pull-up driver circuit 102c is calibrated to the impedance $R_{ext}$ of external resistor 118.

In an embodiment, MUX 108 couples third calibration node C to first input terminal $V_1$ of comparator 110, and ZQ calibration logic 116 then operates to determine first pull-down impedance code $NC_c$ values that calibrate impedance $R_{NC}$ of first pull-down driver circuit 104c to impedance $R_{PC}$ of third pull-up driver circuit 102c. Thus, after completing step 810, impedance $R_{PC}$ of third pull-up driver circuit 102c and impedance $R_{NC}$ of first pull-down driver circuit 104c are both calibrated to the impedance $R_{ext}$ of external resistor 118.

In an embodiment, the ZQ calibration of step 814 is performed on power up. After power-up the ambient temperature of external resistor 118 may increase or decrease during operation. In an embodiment, ZQ calibration of step 814 may be repeated if the ambient temperature of external resistor 118 changes by a predetermined amount from the ambient temperature of external resistor 118 at which ZQ calibration of step 814 was previously performed.

In particular, at step 816 an ambient temperature of external resistor 118 at which step 814 was performed is recorded as previous ambient temperature Tap. At step 818, a determination is made if the magnitude of the difference between the current ambient temperature Tac and previous ambient temperature Tap is greater than a threshold amount $\Delta_E$ (e.g., $\Delta_E$=15° C. or some other amount).

If at step 818 a determination is made that the magnitude of the difference between the current ambient temperature Tac and previous ambient temperature Tap is not greater than threshold amount $\Delta_E$, step 818 is repeated. If at step 818 a determination is made that the magnitude of the difference between the current ambient temperature Tac and previous ambient temperature Tdp is greater than threshold amount $\Delta_E$, then a ZQ calibration of step 814 is repeated. Without wanting to be bound by any particular theory, it is believed that repeating the ZQ calibration step based on ambient temperature variations will improve ZQ calibration accuracy.

Without wanting to be bound by any particular theory, it is believed that ZQ calibration system 100 of FIG. 1 may be used to perform ZQ calibration using either internal resistor circuit 106 or an external resistor coupled to second pad $R_eV_o$.

Without wanting to be bound by any particular theory, it is believed that ZQ calibration system 100 of FIG. 1 may have a size that is much smaller than that of previously known ZQ calibration systems.

Without wanting to be bound by any particular theory, it is believed that ZQ calibration system 100 of FIG. 1 may have a driver impedance error that is much smaller than that of previously known ZQ calibration systems.

Figure 9:
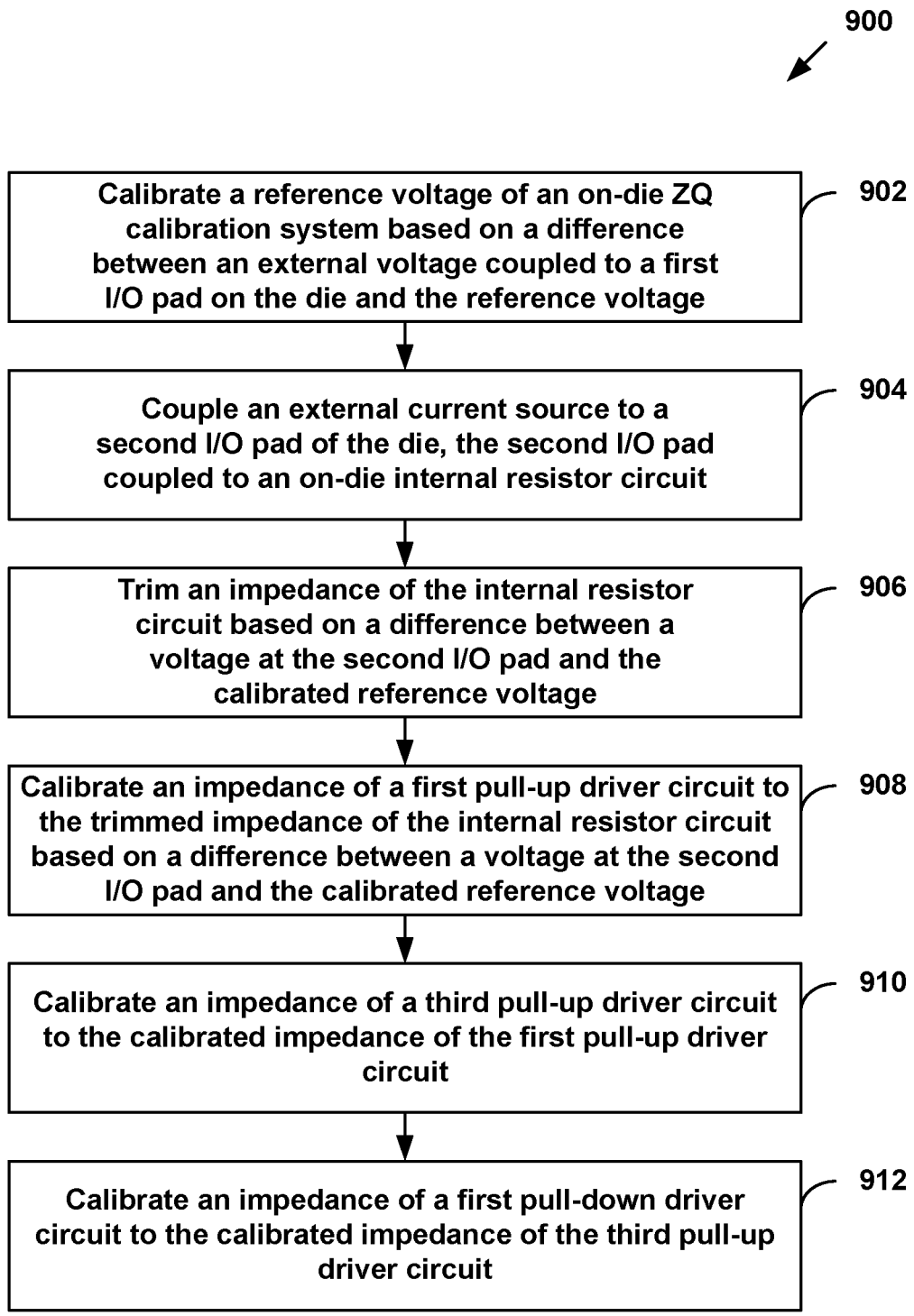
FIG. 9 is a flowchart of an embodiment of a process for operation of dual reference ZQ calibration system of FIG. 1.

FIG. 9 is a flowchart of an example process for use with ZQ calibration system 100 of FIG. 1.

At step 902, calibrate a reference voltage (e.g., $Vref_t$) of on-die ZQ calibration system 100 based on a difference between an external voltage (e.g., $V_{ext}$) coupled to a first I/O pad (e.g., $R_eV_O$) on the die and the reference voltage.

At step 904, couple an external current source (e.g., $I_{ext}$) to a second I/O pad (e.g., $R_{trim}$) of the die, the second I/O pad coupled to an on-die internal resistor circuit (e.g., internal resistor circuit 106).

At step 906, trim an impedance of the internal resistor circuit based on a difference between a voltage at the second I/O pad and the calibrated reference voltage.

At step 908, calibrate an impedance of a first pull-up driver circuit (e.g., first pull-up driver circuit 102i) to the trimmed impedance of the internal resistor circuit based on a difference between a voltage at the second I/O pad and the calibrated reference voltage.

At step 910, calibrate an impedance of a third pull-up driver circuit (e.g., third pull-up driver circuit 102c) to the calibrated impedance of the first pull-up driver circuit.

At step 912, calibrate an impedance of a first pull-down driver circuit (e.g., first pull-down driver circuit 104*c*) to the calibrated impedance of the third pull-up driver circuit.

In an embodiment, the trimmed impedance of the internal resistor circuit substantially equals the calibrated impedance of the third pull-up driver circuit and the calibrated impedance of the first pull-down driver circuit.

Some embodiments are practiced in a memory device. The following discussion provides details of the structure of example memory devices which can implement the proposed technology for dual reference ZQ calibration.

Figure 10A:
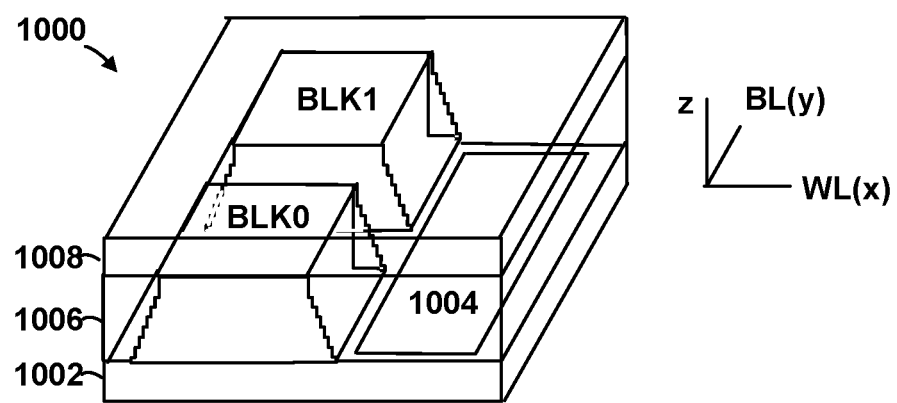
FIG. 10A is a perspective view of a 3D stacked non-volatile memory device.

FIG. 10A is a perspective view of a 3D stacked non-volatile memory device. The memory device 1000 includes a substrate 1002. On and above substrate 1002 are example blocks BLK0 and BLK1 of memory cells (non-volatile storage elements). Also on substrate 1002 is a peripheral area 1004 with circuitry for use by the blocks. Substrate 1002 also can carry circuitry under the blocks, along with one or more lower metal layers which are patterned in conductive paths to carry signals of the circuitry.

Blocks BLK0 and BLK1 are formed in an intermediate region 1006 of memory device 1000. In an upper region 1008 of memory device 1000, one or more upper metal layers are patterned in conductive paths to carry signals of the circuitry. Each of blocks BLK0 and BLK1 includes a stacked area of memory cells, where alternating levels of the stack represent word lines.

In one possible approach, each of blocks BLK0 and BLK1 has opposing tiered sides from which vertical contacts extend upward to an upper metal layer to form connections to conductive paths. Although two blocks BLK0 and BLK1 are depicted as an example, additional blocks can be used, extending in the x- and/or y-directions. Additionally, note that components are considered to be connected if they are directly connected or indirectly connected.

In one possible approach, the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of memory device 1000.

Figure 10B:
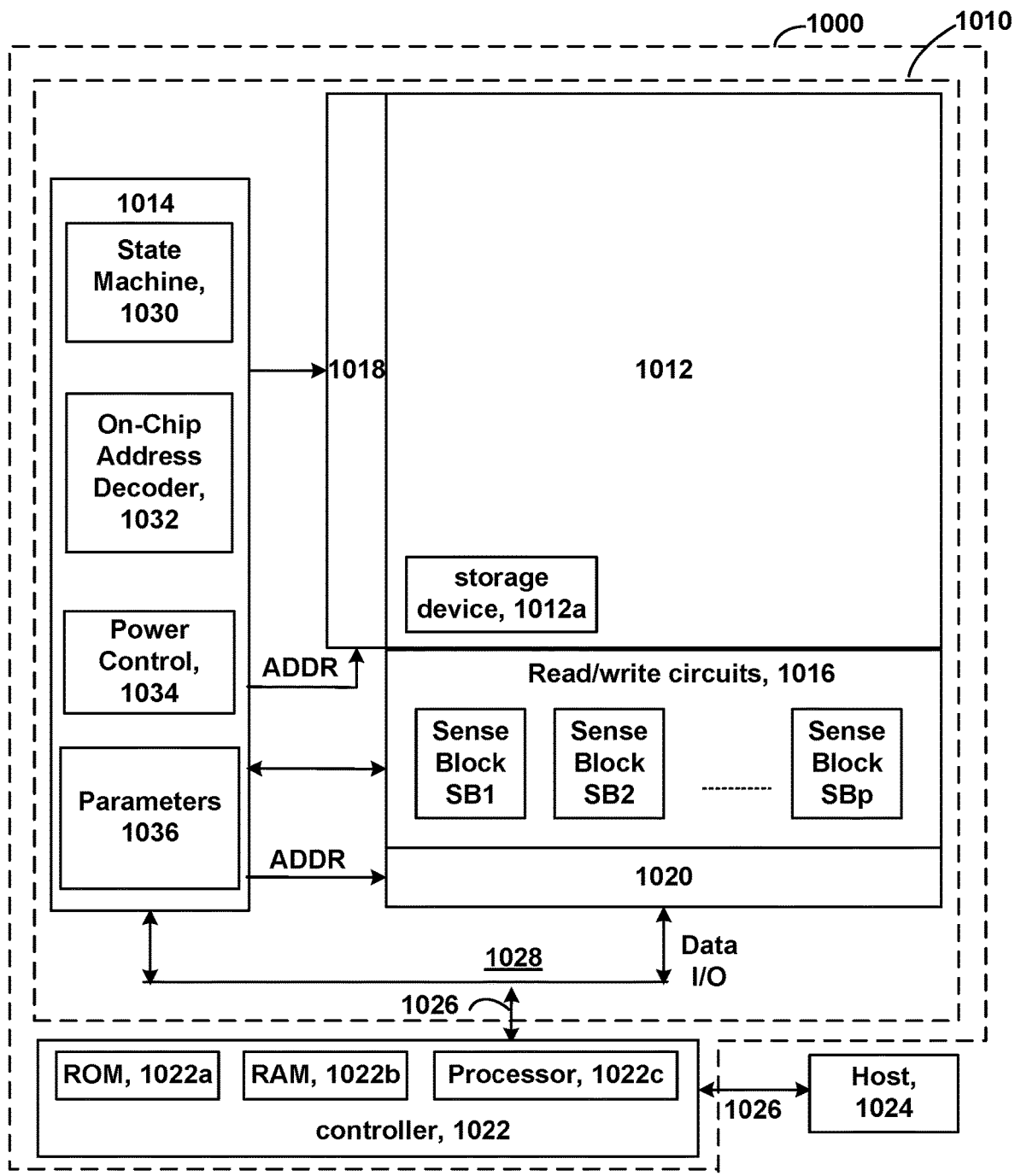
FIG. 10B is a functional block diagram of a memory device such as the 3D stacked non-volatile memory device of FIG. 10A.

FIG. 10B is a functional block diagram of a memory device 1000 such as the 3D stacked non-volatile memory device 1000 of FIG. 10A. Memory device 1000 may include one or more memory die 1010. Memory die 1010 includes a memory structure 1012 of memory cells, such as an array of memory cells, control circuitry 1014, and read/write circuits 1016. In a 3D configuration, memory structure 1012 can include the blocks BLK0 and BLK1 of FIG. 10A.

Memory structure 1012 is addressable by word lines via a row decoder 1018 and by bit lines via a column decoder 1020. Read/write circuits 1016 include multiple sense blocks SB1, SB2, . . . , SBp (sensing circuitry) and allow a page of memory cells to be read or programmed in parallel. Typically a controller 1022 is included in the same memory device 1000 (e.g., a removable storage card) as the one or more memory die 1010.

In some embodiments, one controller will communicate with multiple memory die 1010. Commands and data are transferred between a host 1024 and controller 1022 via a data bus 1026 and between controller 1022 and the one or more memory die 1010 via lines 1026. Memory die 1010 has I/O circuitry 1028, in one embodiment. I/O circuit 1028 may contain output buffers. In one embodiment, a ZQ calibration of the output buffers is performed using the circuit of FIG. 1.

Memory structure 1012 can be a two dimensional structure or a three dimensional structure of memory cells (e.g., NAND flash memory cells). Memory structure 1012 may include one or more array of memory cells including a 3D array. Memory structure 1012 may include a monolithic three dimensional memory structure in which multiple memory levels are formed above (and not in) a single substrate, such as a wafer, with no intervening substrates.

Memory structure 1012 may include any type of non-volatile memory that is monolithically formed in one or more physical levels of arrays of memory cells having an active area disposed above a silicon substrate. Memory structure 1012 may be in a non-volatile memory device having circuitry associated with the operation of the memory cells, whether the associated circuitry is above or within the substrate.

Control circuitry 1014 cooperates with read/write circuits 1016 to perform memory operations on memory structure 1012, and includes a state machine 1030, an on-chip address decoder 1032, and a power control module 1034. State machine 1030 provides chip-level control of memory operations. Parameter storage 1036 may be provided for storing operational parameters.

On-chip address decoder 1032 provides an address interface between that used by the host or a memory controller to the hardware address used by the decoders 1018 and 1020. Power control module 1034 controls the power and voltages supplied to the word lines and bit lines during memory operations. It can include drivers for word line layers (WLLs) in a 3D configuration, SGS and SGD transistors and source lines.

Sense blocks SB1, SB2, . . . , SBp can include bit line drivers, in one approach. An SGS transistor is a select gate transistor at a source end of a NAND string, and an SGD transistor is a select gate transistor at a drain end of a NAND string.

In various embodiments, one or more of control circuitry 1014, state machine 1030, decoders 1018/1020/1032, power control module 1034, sense blocks SB1, SB2, . . . , SBp, read/write circuits 1016, and controller 1022 can be thought of as at least one or more control circuits.

Controller 1022 may include storage devices (memory) such as ROM 1022*a* and RAM 1022*b* and a processor 1022*c*. The storage devices comprise code such as a set of instructions, and processor 1022*c* is operable to execute the set of instructions to provide the functionality described herein. Alternatively or additionally, processor 1022*c* can access code from a storage device 1012*a* of memory structure 1012, such as a reserved area of memory cells in one or more word lines.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

Memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND flash memory) typically contain memory elements connected in series. A NAND string is an example of a set of series-connected transistors comprising memory cells and select gate transistors.

A NAND flash memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

Memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements.

The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels.

Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon.

In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays.

Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

Figure 11:
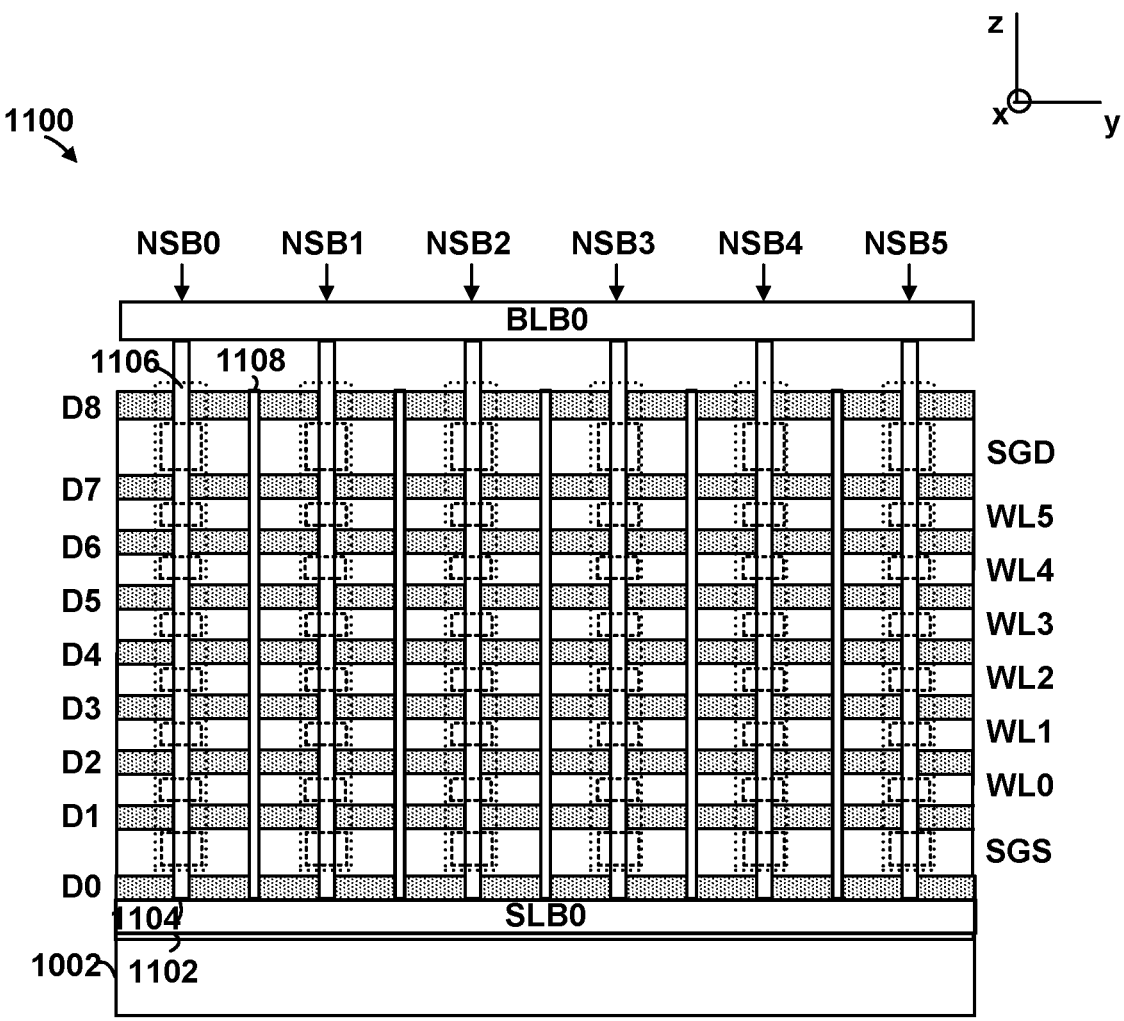
FIG. 11 depicts a cross-sectional view of a block of the 3D non-volatile memory device of having straight strings.

FIG. 11 depicts a cross-sectional view of a block of the 3D non-volatile memory device of having straight strings. The block contains a number of non-volatile storage elements. This is one example that can be used in the memory array in FIG. 10B. The stack 1100 contains alternating layers of conductive layers (SGS, WL0-WL5, SGD) and insulating (D0-D8). The conductive layers could be tungsten, highly doped silicon, etc. The insulating layers could be silicon nitride, etc.

Columns of memory cells corresponding to NAND strings NSB0 to NSB5, respectively, are depicted in the multi-layer stack. The stack 1100 includes a substrate 1002, an insulating film 1102 on substrate 1002, and a portion of a source line SLB0. NAND strings NSB0 to NSB5 are each in a different sub-block, but are in a common set of NAND strings.

NSB0 has a source end 1104 and a drain end 1106. A slit 1108 is also depicted with other slits. Slits may be formed from an insulator, such as silicon oxide. A portion of the bit line BLB0 is also depicted. Dashed lines depict memory cells and select gates. Memory cells in in layers WL0-WL5. Select gates are in layers SGS and SGD.

One embodiment of the disclosed technology includes a first pull-up driver circuit coupled to a first calibration node and a first input/output pad on an integrated circuit die. a second pull-up driver circuit coupled to a second calibration node and a second input/output pad on the integrated circuit die, a third pull-up driver circuit coupled to a third calibration node, an internal resistor circuit coupled to the first calibration node, a comparator including a first input terminal that may be selectively coupled to one of the first calibration node, the second calibration node and the third calibration node, and a second input terminal coupled to a reference voltage, and circuitry configured to trim the reference voltage to compensate for an offset of the comparator, and trim an impedance of the internal resistor circuit based on a comparison between a voltage on the first calibration node and the trimmed reference voltage, wherein the trimmed impedance of the internal resistor circuit substantially equals a desired impedance of the third pull-up driver circuit.

One embodiment of the disclosed technology includes a non-volatile memory device including a memory die including a plurality of memory cells, a first calibration node coupled to a first input/output pad of the memory die and a first variable impedance circuit including an impedance that varies based on a first code, a second calibration node coupled to a second input/output pad of the memory die and a second variable impedance circuit including an impedance that varies based on a second code, a third calibration node coupled to a third variable impedance circuit and a fourth variable impedance circuit, the third variable impedance circuit including an impedance that varies based on a third code, the fourth variable impedance circuit including an impedance that varies based on a fourth code, an internal resistor circuit coupled to the first node, and calibration circuitry coupled to the first variable impedance circuit, the second variable impedance circuit, the third variable impedance circuit, the fourth variable impedance circuit and the internal resistor circuit. The calibration circuitry is configured to provide the first code based on a difference between a voltage at the first calibration node and a reference voltage, provide the second code based on a difference between a voltage at the second calibration node and the reference voltage, provide the third code and the fourth code based on a difference between a voltage at the third calibration node and the reference voltage, and trim an impedance of the internal resistor circuit based on a difference between a voltage at the first calibration node and the reference voltage. The internal resistor circuit includes a fixed resistor including a same order of magnitude as a desired impedance of the third variable impedance circuit and the fourth variable impedance circuit.

One embodiment of the disclosed technology includes a method that includes calibrating a reference voltage of an on-die ZQ calibration system based on a difference between an external voltage coupled to a first I/O pad on the die and the reference voltage, coupling an external current source to a second I/O pad of the die, the second I/O pad coupled to an on-die internal resistor circuit, trimming an impedance of the internal resistor circuit based on a difference between a voltage at the second I/O pad and the calibrated reference voltage, calibrating an impedance of a first pull-up driver circuit to the trimmed impedance of the internal resistor circuit based on a difference between a voltage at the second I/O pad and the calibrated reference voltage, calibrating an impedance of a third pull-up driver circuit to the calibrated impedance of the first pull-up driver circuit, and calibrating an impedance of a first pull-down driver circuit to the calibrated impedance of the third pull-up driver circuit. The trimmed impedance of the internal resistor circuit substantially equals the calibrated impedance of the third pull-up driver circuit and the calibrated impedance of the first pull-down driver circuit.

For purposes of this document, a first layer may be over or above a second layer if zero, one, or more intervening layers are between the first layer and the second layer.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
   a first pull-up driver circuit coupled to a first calibration node and a first input/output pad on an integrated circuit die;
   a second pull-up driver circuit coupled to a second calibration node and a second input/output pad on the integrated circuit die;
   a third pull-up driver circuit coupled to a third calibration node;
   an internal resistor circuit coupled to the first calibration node;

a comparator comprising a first input terminal that may be selectively coupled to one of the first calibration node, the second calibration node and the third calibration node, and a second input terminal coupled to a reference voltage; and circuitry configured to:
trim the reference voltage to compensate for an offset of the comparator; and
trim an impedance of the internal resistor circuit based on a comparison between a voltage on the first calibration node and the trimmed reference voltage,
wherein the trimmed impedance of the internal resistor circuit substantially equals a desired impedance of the third pull-up driver circuit wherein the internal resistor circuit comprises a fixed resistor disposed in parallel with a coarse trim circuit and a fine trim circuit, and wherein:
the coarse trim circuit is configured to selectively perform a coarse trim of an impedance of the fixed resistor, and
the fine trim circuit is configured to selectively perform a fine trim of the impedance of the fixed resistor.

2. The apparatus of claim 1, further comprising circuitry configured to perform a ZQ calibration using the trimmed impedance of the internal resistor circuit.

3. The apparatus of claim 1, further comprising circuitry configured to trim an impedance of the internal resistor circuit based on a temperature of the integrated circuit die.

4. The apparatus of claim 1, further comprising circuitry configured to calibrate an impedance of the first pull-up driver circuit based on the trimmed impedance of the internal resistor circuit.

5. The apparatus of claim 1, further comprising circuitry configured to calibrate an impedance of the third pull-up driver circuit based on the trimmed impedance of the internal resistor circuit.

6. The apparatus of claim 1, further comprising a first pull-down driver circuit coupled to the third calibration node.

7. The apparatus of claim 6, further comprising circuitry configured to calibrate an impedance of the first pull-down driver circuit based on the trimmed impedance of the internal resistor circuit.

8. The apparatus of claim 1, wherein the internal resistor circuit further comprises a temperature trim circuit disposed in parallel with the fixed resistor, wherein the temperature trim circuit is configured to selectively perform a trim of the impedance of the fixed resistor based on a temperature of the integrated circuit die.

9. The apparatus of claim 1, wherein the internal resistor circuit comprises a fixed resistor that has an impedance on an order of magnitude of the desired impedance of the third pull-up driver circuit.

10. The apparatus of claim 1, further comprising circuitry configured to perform a ZQ calibration using an external resistor coupled to the second I/O pad.

11. A non-volatile memory device comprising:
a memory die comprising a plurality of memory cells;
a first calibration node coupled to a first input/output pad of the memory die and a first variable impedance circuit comprising an impedance that varies based on a first code;
a second calibration node coupled to a second input/output pad of the memory die and a second variable impedance circuit comprising an impedance that varies based on a second code;
a third calibration node coupled to a third variable impedance circuit and a fourth variable impedance circuit, the third variable impedance circuit comprising an impedance that varies based on a third code, the fourth variable impedance circuit comprising an impedance that varies based on a fourth code;
an internal resistor circuit coupled to the first node; and
calibration circuitry coupled to the first variable impedance circuit, the second variable impedance circuit, the third variable impedance circuit, the fourth variable impedance circuit and the internal resistor circuit, the calibration circuitry configured to:
provide the first code based on a difference between a voltage at the first calibration node and a reference voltage;
provide the second code based on a difference between a voltage at the second calibration node and the reference voltage;
provide the third code and the fourth code based on a difference between a voltage at the third calibration node and the reference voltage; and
trim an impedance of the internal resistor circuit based on a difference between a voltage at the first calibration node and the reference voltage,
wherein the internal resistor circuit comprises a fixed resistor comprising a same order of magnitude as a desired impedance of the third variable impedance circuit and the fourth variable impedance circuit.

12. The non-volatile memory of claim 11, wherein the internal resistor circuit comprises a fixed resistor disposed in parallel with a coarse trim circuit and a fine trim circuit, wherein:
the coarse trim circuit is configured to selectively perform a coarse trim of the impedance of the internal resistor circuit, and
and the fine trim circuit is configured to selectively perform a fine trim of the impedance of the internal resistor circuit.

13. The non-volatile memory of claim 12, wherein the internal resistor circuit further comprises a temperature trim circuit disposed in parallel with the fixed resistor, wherein the temperature trim circuit is configured to selectively perform a trim of the impedance of the internal resistor circuit based on a temperature of the memory die.

14. The non-volatile memory of claim 11, further comprising circuitry configured to perform a ZQ calibration using the internal resistor circuit.

15. The non-volatile memory of claim 11, further comprising circuitry configured to perform a ZQ calibration using an external resistor coupled to the second input/output pad.

16. The non-volatile memory of claim 15, wherein the impedance of the internal resistor circuit substantially equals an impedance of the external resistor.

17. The non-volatile memory of claim 11, further comprising circuitry configured to perform a ZQ calibration using either the internal resistor circuit or an external resistor coupled to the second input/output pad.

18. A method comprising:
calibrating a reference voltage of an on-die ZQ calibration system based on a difference between an external voltage coupled to a first I/O pad on the die and the reference voltage;
coupling an external current source to a second I/O pad of the die, the second I/O pad coupled to an on-die internal resistor circuit;
trimming an impedance of the internal resistor circuit based on a difference between a voltage at the second I/O pad and the calibrated reference voltage;

calibrating an impedance of a first pull-up driver circuit to the trimmed impedance of the internal resistor circuit based on a difference between a voltage at the second I/O pad and the calibrated reference voltage;

calibrating an impedance of a third pull-up driver circuit to the calibrated impedance of the first pull-up driver circuit; and calibrating an impedance of a first pull-down driver circuit to the calibrated impedance of the third pull-up driver circuit, wherein the trimmed impedance of the internal resistor circuit substantially equals the calibrated impedance of the third pull-up driver circuit and the calibrated impedance of the first pull-down driver circuit.

19. The method of claim 18, further comprising:

coupling an external resistor to the first I/O pad, the external resistor comprising an impedance that substantially equals the trimmed impedance of the internal resistor circuit;

calibrating an impedance of a second pull-up driver circuit to the impedance of the external resistor;

calibrating an impedance of a third pull-up driver circuit to the calibrated impedance of the second pull-up driver circuit; and calibrating an impedance of a first pull-down driver circuit to the calibrated impedance of the third pull-up driver circuit.

\* \* \* \* \*